United States Patent
Tai

(10) Patent No.: US 6,377,571 B1
(45) Date of Patent: Apr. 23, 2002

(54) VIRTUAL MODEM FOR DIALOUT CLIENTS IN VIRTUAL PRIVATE NETWORK

(75) Inventor: Wayming Daniel Tai, Cupertino, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/065,331

(22) Filed: Apr. 23, 1998

(51) Int. Cl.[7] .............................................. H04L 12/66
(52) U.S. Cl. ...................................... 370/355; 370/401
(58) Field of Search .................................. 370/400, 401, 370/466, 230, 352, 353, 356, 355, 465; 713/201; 709/249

(56) References Cited

U.S. PATENT DOCUMENTS

| | | | | |
|---|---|---|---|---|
| 5,426,637 A | * | 6/1995 | Derby et al. | 370/401 |
| 6,101,543 A | * | 8/2000 | Alden et al. | 709/229 |
| 6,158,011 A | * | 12/2000 | Chen et al. | 713/201 |
| 6,226,751 B1 | * | 5/2001 | Arrow et al. | 713/201 |
| 6,233,234 B1 | * | 5/2001 | Curry et al. | 370/356 |

* cited by examiner

*Primary Examiner*—Min Jung
(74) *Attorney, Agent, or Firm*—McDonnell Buehnen Hulbert & Berghoff

(57) ABSTRACT

The present invention provides method and apparatus to provide local clients with the capability to dial-out through a packet processor to a remote line server to access a remote client. A packet processor is disclosed which includes a first and second interface and a bridge/router. The remote client is coupled through respectively a first network, a remote line server, and a second point-to-point network to the packet processor. The first interface couples to each of the local clients and detects data packets from one of the local clients which contain a dial-out phone number of the remote client. The second interface couples to the first network and opens a first point-to-point connection to the remote line server, responsive to the detecting of the packet. The bridge/router passes the dial-out phone number to the remote line server across the first point-to-point connection to cause the remote line server to establish a second point-to-point connection to the remote client for the transfer of data packets from the local client. The local clients may include a modem shell for redirecting modem communications including a dial-out phone number from an application on the local client to the packet processor across a packet switched network.

64 Claims, 17 Drawing Sheets

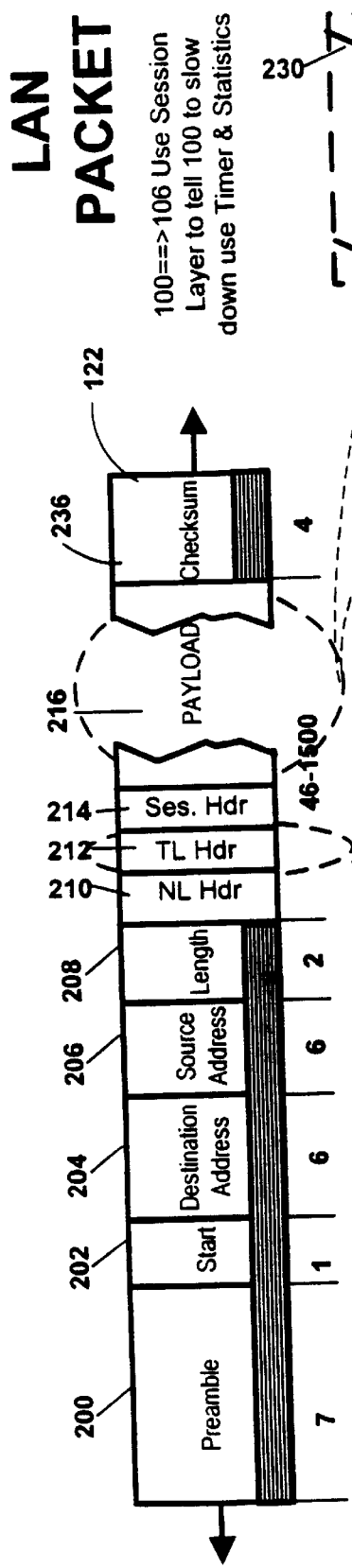
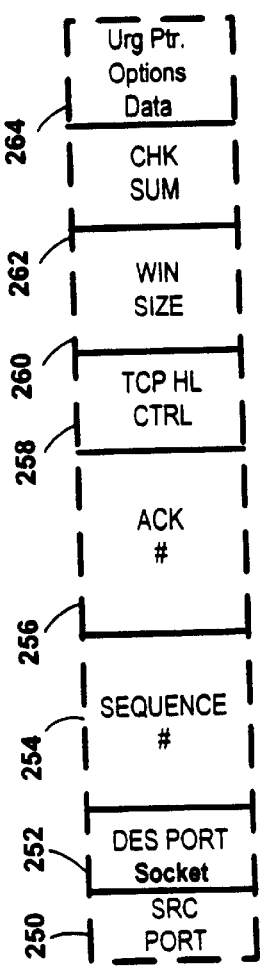
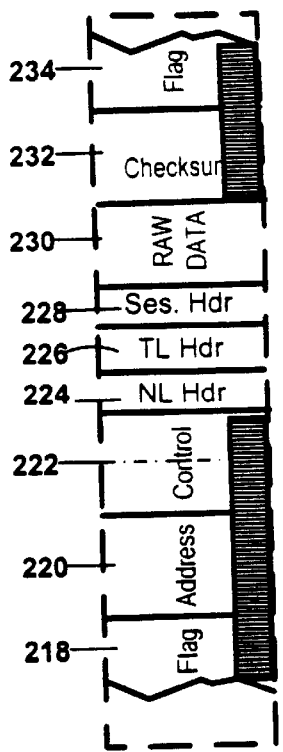

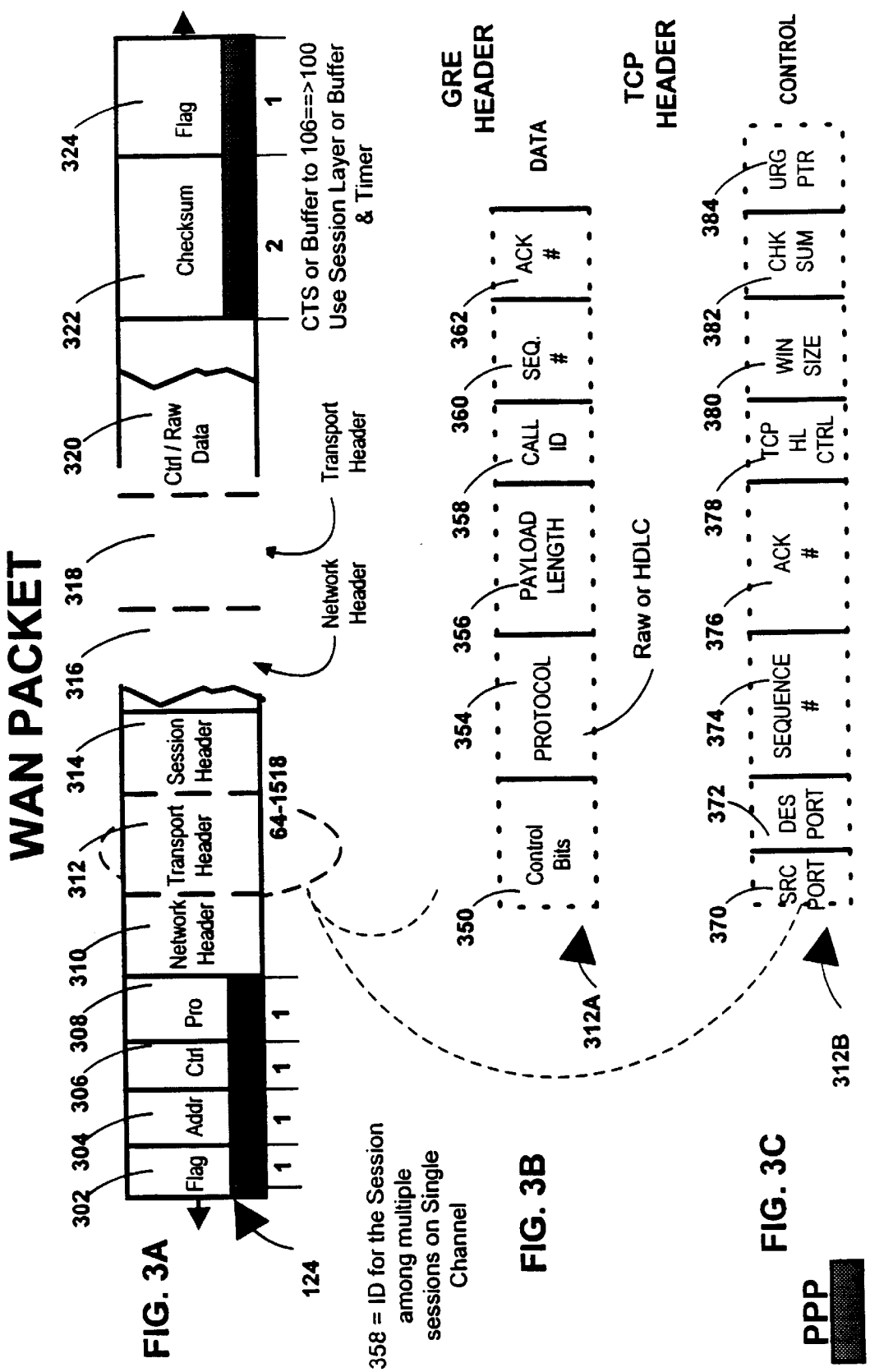

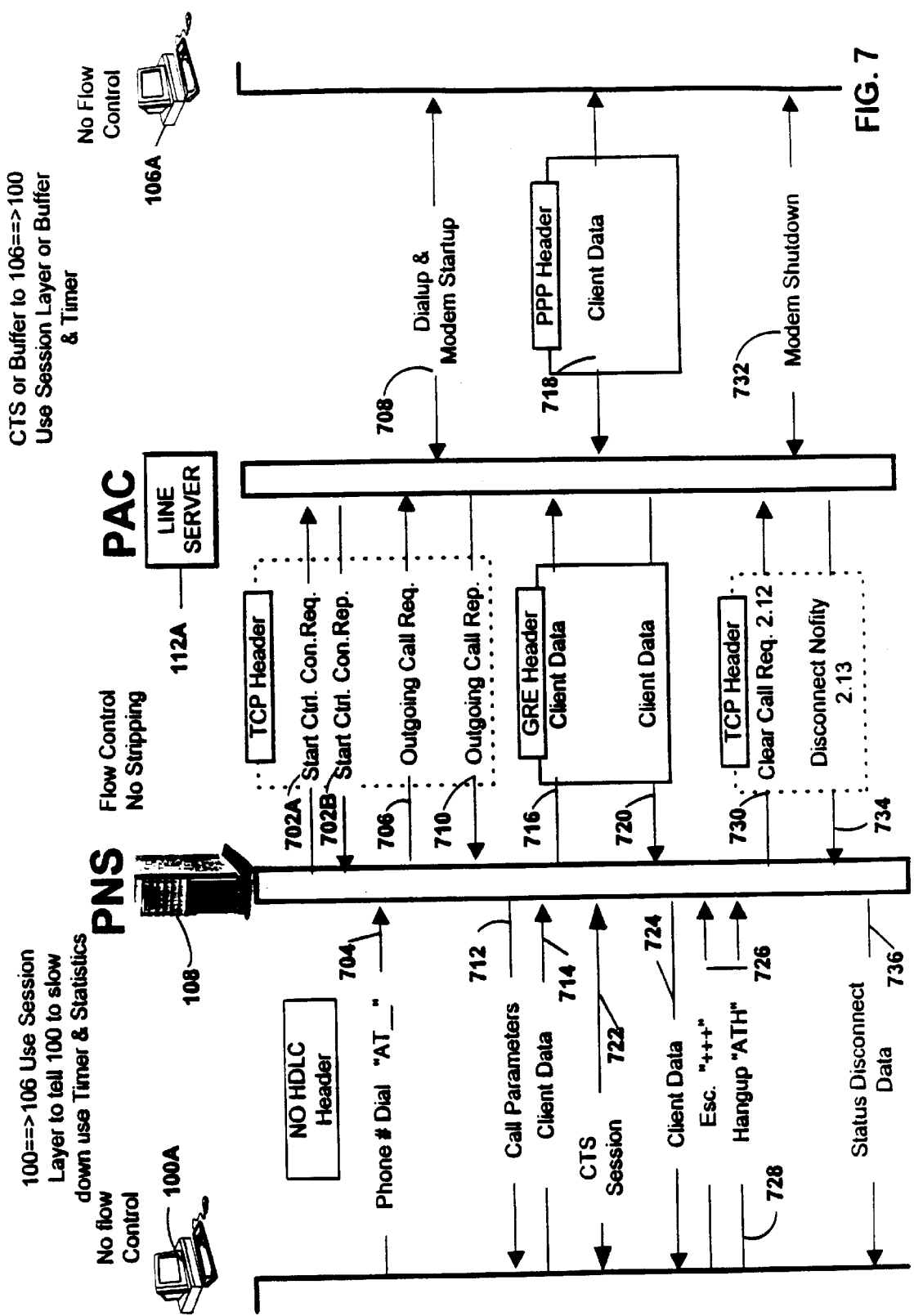

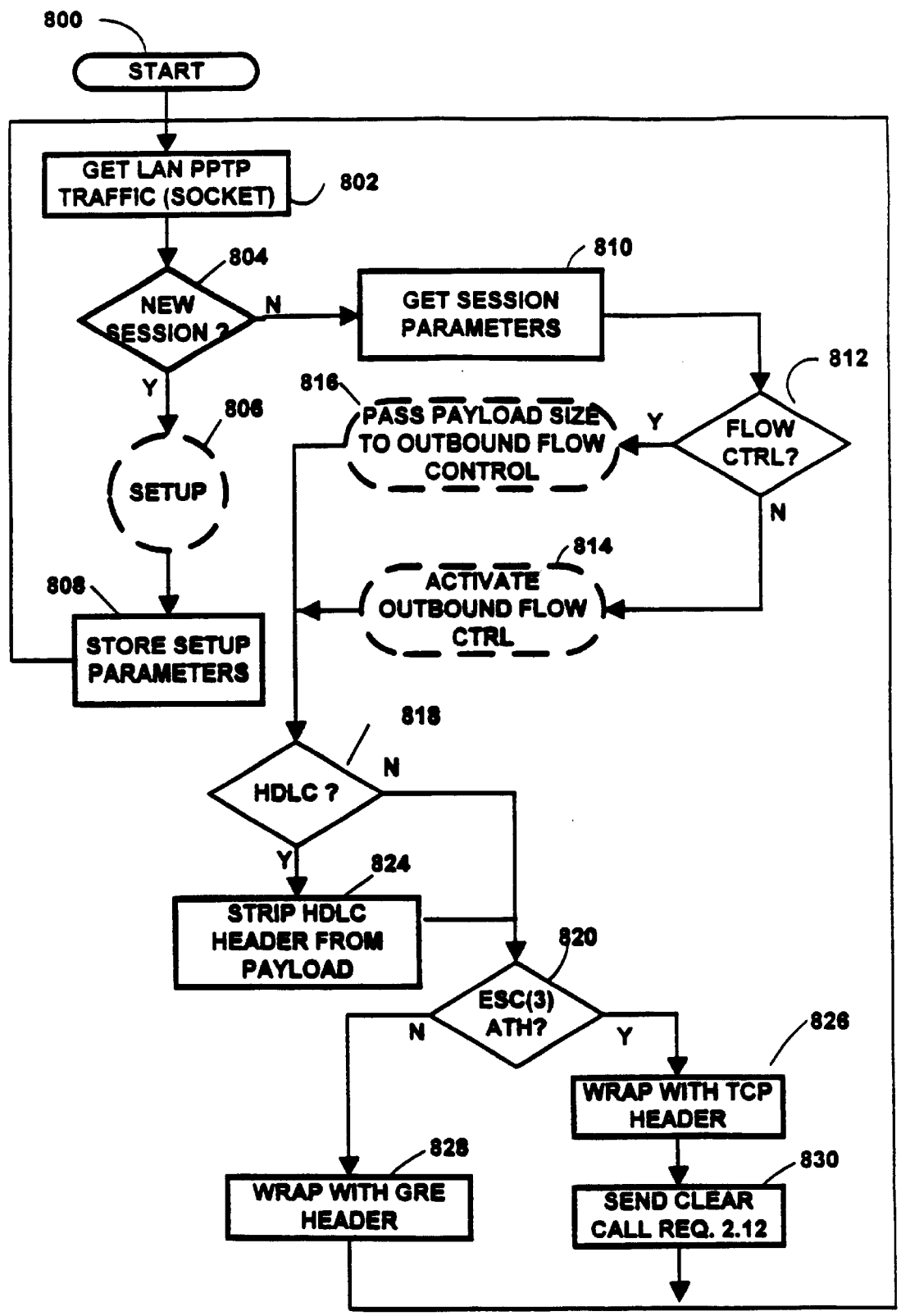
FIG. 8A      OUTGOING LAN TRAFFIC

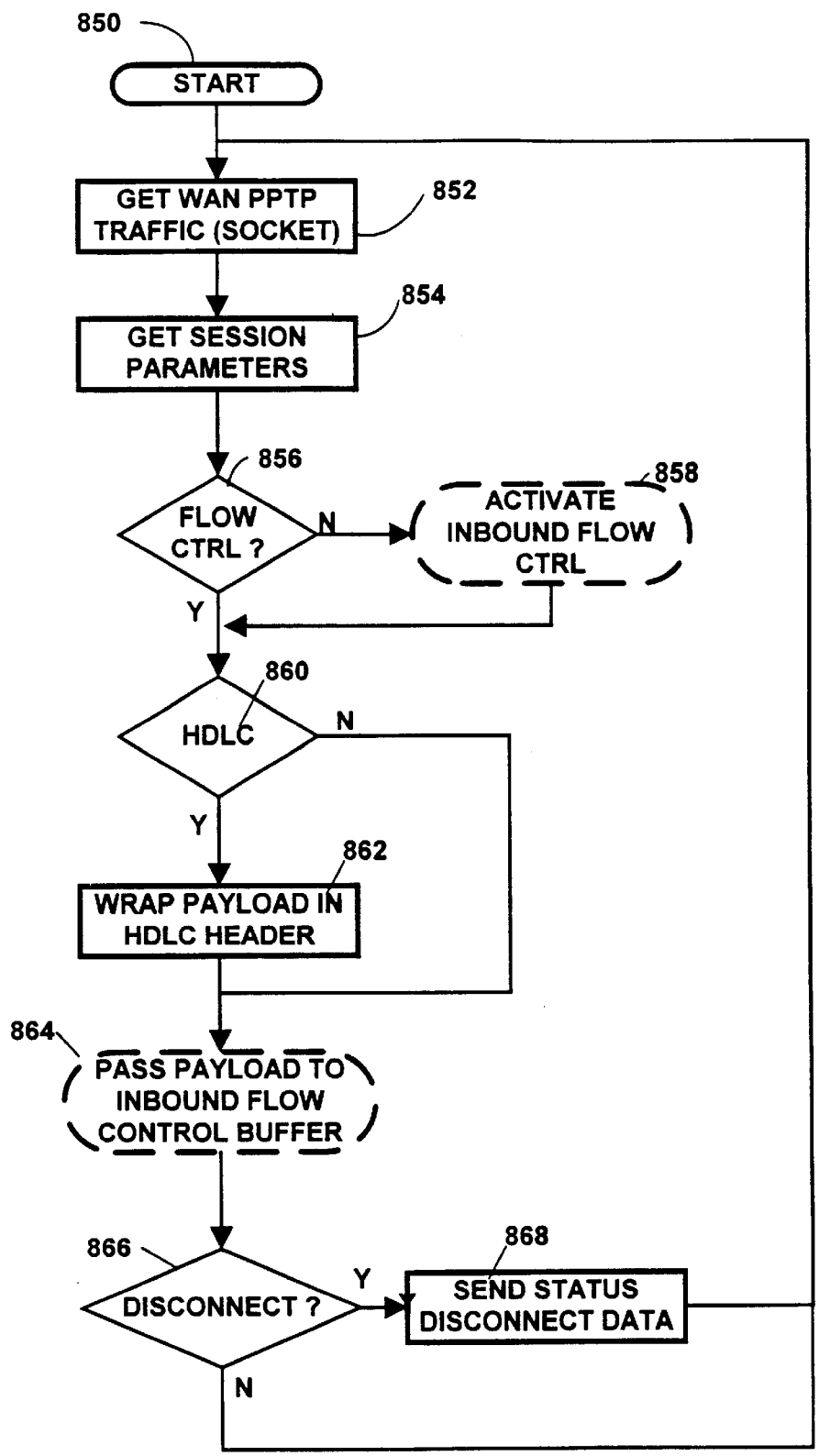
FIG. 8B   INCOMING WAN TRAFFIC

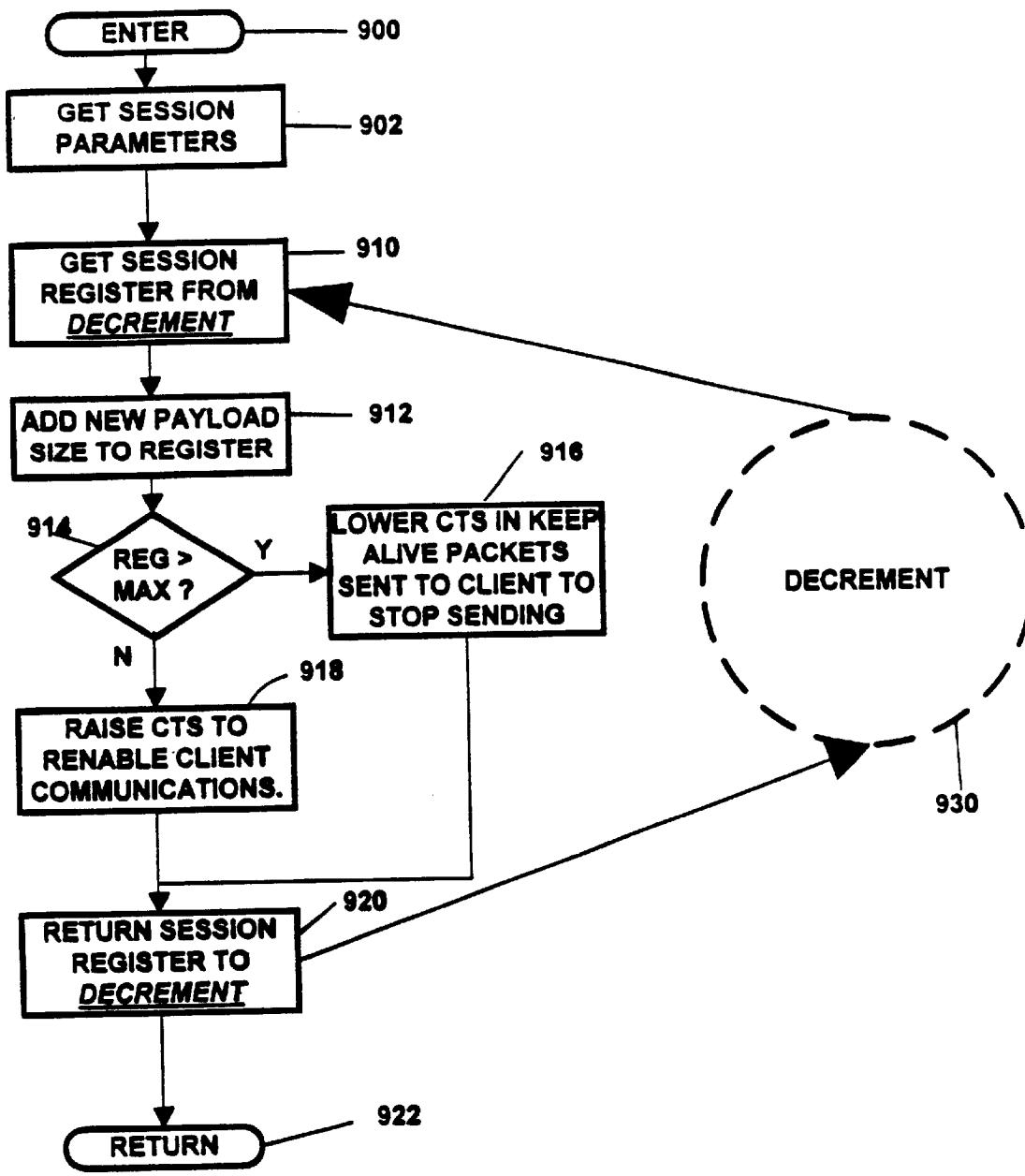
OUTBOUND FLOW CTRL (1)      FIG. 9A

DECREMENT OUTBOUND FLOW CONTROL

INBOUND FLOW CONTROL

SETUP

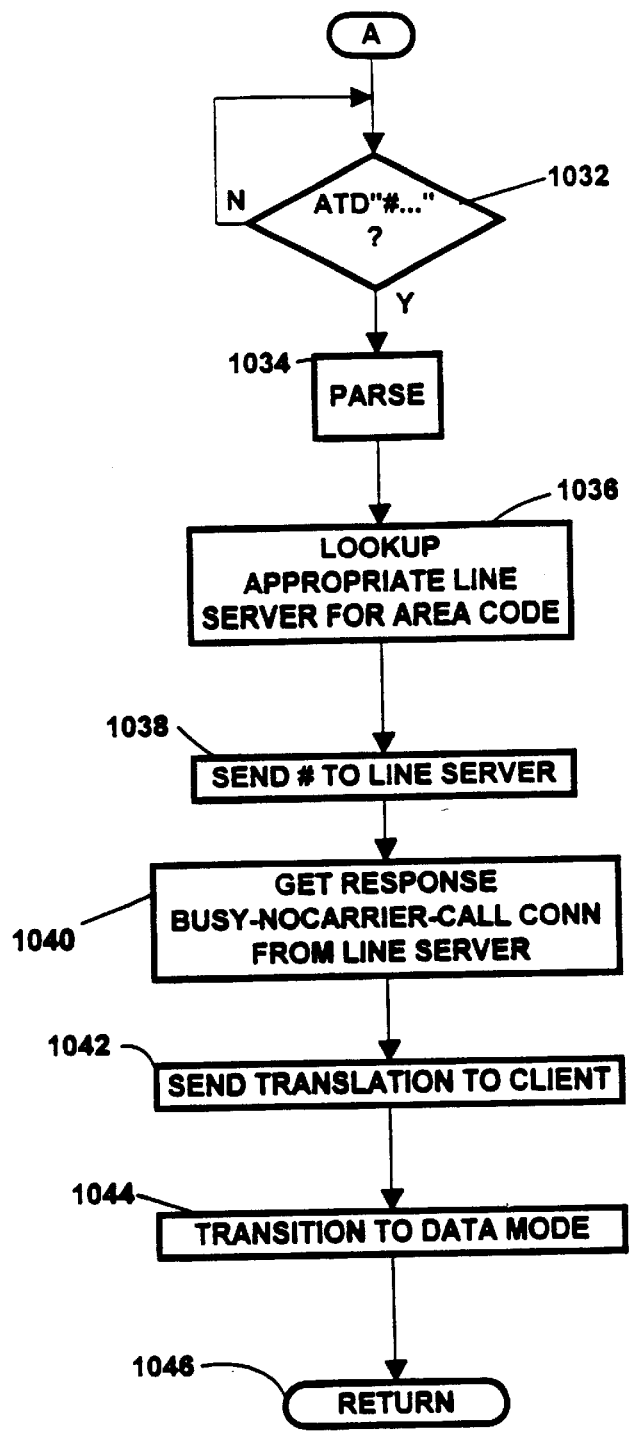
FIG. 9E        SETUP

VIRTUAL MODEM FOR DIALOUT CLIENTS IN VIRTUAL PRIVATE NETWORK

BACKGROUND

1. Field of the Invention

The present invention relates to data communications, and more particularly to techniques for improving the flexibility and useability of point-to-point communication protocols, such as the Point-to-Point Protocol (PPP).

2. Related Art

Historically, computer networks and the public switched telephone network (PSTN) developed independently, and are in many ways dissimilar. Computer networks carried only data and the PSTN carried voice. Computer networks broadcast information on shared physical circuits in packets with source and destination identifiers while the PSTN dedicates physical circuits from source to destination for each call session. Computer networks broadcast data on digital circuits, while the PSTN carries voice over both analog local subscriber lines and digital long distance circuits.

The PSTN is now assuming many of the characteristics associated with computer networks. The PSTN is increasingly being used to connect individual computers and local area computer networks (LANs) to other computer networks to form wide area networks (WAN) such as the Internet. This requires that the PSTN handle both circuit-switched and packet-switched communications. Initially this is being accomplished by adding equipment to the PSTN which allows packet-switched technology to be overlaid on the existing circuit-switched backbone of the PSTN.

Protocols such as the Point-to-Point Protocol (PPP), is used for transporting multi-protocol datagrams over point-to-point links such as those setup by a traditional dial-up PSTN connection. One version of the PPP is described in Request For Comments RFC 1661, published in July 1994 by the Point-to-Point Protocol Working Group of the Internet Engineering Task Force IETF. A typical scenario involves a home user calling an Internet Service Provider (ISP) to make a home PC a temporary Internet host. The PC first calls the ISP's router via a modem. After the router's modem has answered the phone and established a physical connection the PC sends the router a series of packets in the payload field of one or more PPP frames. Once an IP address is assigned to the PC by the ISP the PC can now act as an Internet host and can send and receive IP packets.

Network access servers have been developed to interface digital packet-switched networks of computers, e.g. LANs, with analog local subscriber lines of the PSTN. These network access servers come in a number of forms. Integrated network access servers combine a packet processor and line server in the same housing, while split network access servers separate line servers and packet processors with at least one intermediate digital network.

Integrated network access servers interface a LAN with remote clients via one or more analog subscriber lines. Integrated network access servers combine in a single box, a line server and a packet processor. The integrated network access server typically exists as a node on a LAN. The line server connects to analog telephone lines, and the packet processor connects to a packet-switched network. The line server and packet processor connect to each other through internal connections within the integrated module. The line server includes modems each of which connects to analog subscriber telephone lines and handles data communications across the subscriber lines with remote clients. Transmission of data across these analog subscriber lines requires a modem to convert the digital signals generated by computers into analog tones for transmission over telephone network analog facilities. The packet processor connects to a packet-switched network, e.g. the LAN. The packet processor makes decisions about whether a call can be accepted from a telephone line and how to forward the constituent data packets to local clients on the LAN.

Some integrated network access servers allow local clients on the LAN to dial-out to the remote client over a long distance connection. The dial-out process is initiated by a local client with processes which allow it to communicate through the communication server. The communication server includes a bank of modems. The client dials a number, the number is passed across the LAN to the packet processor and then to the line server. The line server allocates one among a number of the modems to make the call over the analog subscriber line to the remote client. Network Products Corporation (NPC) 1440 West Colorado Blvd., Pasadena, Calif. 91105-1414 provides such capability. The advantage to this product is that it lets clients on a LAN share modem resources of a local line server. The disadvantage to this product is that it is predicated on an architecture in which a LAN is connected over analog subscriber lines to a WAN. Increasingly LANs are connected directly to a WAN via a digital network such as the Integrated Services Digital Network (ISDN).

ISDN can be viewed as an evolutionary progression and a conversion of analog telephone systems into an eventual all-digital network with both voice and data to be carried end-to-end in digital form. The ISDN network architecture is based on standards set by the International Telecommunications Union (ITU) with standards in the United States largely driven by American National Standards Institute (ANSI). ISDN provides relatively high speed digital transmission service on an "as needed" basis, and is different from LAN transmission media in that it is a circuit-switched transmission media which provides a point-to-point transmission service on an intermittent basis. ISDN enables LANs to be interconnected with each other to form a WAN.

Split network access servers may interface a LAN with remote clients via an intermediate digital network plus one or more analog subscriber lines. Split network access servers include separate line servers and packet processors connected to one another across a PPP channel on a WAN such as the Internet. This arrangement allows a virtual private network to be created between a remote line server and a local packet processor. A typical scenario involves a remote client dialin. The remote client dials the remote line server over a local analog subscriber line. The remote line server passes the communication in a PPP packet to the local packet processor. The local packet processor passes the communication to the appropriate client connected to the packet processor via the LAN. The advantage to split network access servers is that they allow inexpensive call setup from remote clients dialing in through remote line server to local clients on a LAN. The calls are inexpensive because they may be routed over the Internet as packets, rather than over a dedicated long distance voice circuit. The disadvantage to split network access servers is that they do not support dial-out from local clients on the LAN to remote clients.

Methods for improving the utilization of the PPP connections are being developed. These methods known as tunneling protocols, allow a single channel to multiplex multiple sessions from several users each with a plurality of packets.

The specifics of a tunneling protocol are set forth in the point-to-point tunneling protocol (PPTP) June 1997 draft-ietf-pppext-pptp-01.txt, prepared by the Internet Engineering Task Force (IETF), which is incorporated by reference as if fully set forth herein. This document specifies a protocol which allows the PPP to be tunneled through an IP network. PPTP specifies a call-control management protocol which allows the line server to control access for dial-in circuit-switched calls originating from a PSTN or ISDN.

What is needed are techniques which overcome the disadvantages of split and integrated network access servers.

SUMMARY

The present invention provides local clients with the capability to dial-out through a packet processor to a remote line server to access a remote client.

Accordingly, the present invention can be characterized as a call-setup method implemented on a system which includes a local client coupled to a remote client through respectively, a packet processor, a first network, a remote line server, and a second point-to-point network. The call-setup method comprises the acts implemented on the packet processor of:

detecting data packets from the local client which include a dial-out phone number of the remote client;

opening a first point-to-point connection to the remote line server;

passing the dial-out phone number to the remote line server to cause the remote line server to establish a second point-to-point a connection to the remote client; and transferring data packets from the local client through the first point-to-point connection to the remote client.

According to one aspect of the invention the call-set up method may additionally include the act implemented on the local client of:

redirecting modem communications including a dial-out phone number from an application on the local client to the packet processor across a packet switched network.

According to another aspect of the invention a packet processor is disclosed which includes a first and second interface and a bridge/router. The packet processor provides each of a plurality of local clients, dial-out capability to a remote client. The remote client is coupled through respectively a first network, a remote line server, and a second point-to-point network to the packet processor. The first interface couples to each of the local clients and detects data packets from one of the local clients, a packet which contains a dial-out phone number of the remote client. The second interface couples to the first network and opens a first point-to-point connection to the remote line server, responsive to the detecting of the packet. The bridge/router passes the dial-out phone number to the remote line server across the first point-to-point connection to cause the remote line server to establish a second point-to-point connection to the remote client for the transfer of data packets from the local client.

According to yet another aspect of the invention the local client is disclosed to include a modem shell for redirecting modem communications including a dial-out phone number from an application on the local client to the packet processor across a packet switched network.

DESCRIPTION OF THE FIGURES

FIGS. 2–4 show detailed views of specific embodiments of the packet structures on respectively a local area network, a wide area network and a subscriber line.

FIG. 7 is a stick diagram showing the sequence of events associated with sessions setup, data transfer and session termination for dial-out from clients through remote line servers.

FIGS. 8A–B are process flow diagrams showing call setup, data transfer and call termination.

FIGS. 9A–E are process flow diagrams showing details of the processes set forth in FIGS. 8A–B.

DESCRIPTION

The following description is presented to enable a person skilled in the art to make and use the invention, and is provided in the context of a particular application and its requirements. Various modifications to the preferred embodiment will be readily apparent to those skilled in the art and the general principles defined herein may be applied to other embodiments and applications without departing from the spirit and scope of the invention. Thus, the present invention is not intended to be limited to the embodiment shown, but is to be accorded the widest scope consistent with the principles and features disclosed herein.

The present invention provides method and apparatus for overcoming the disadvantages of existing split network access servers. The current invention allows local clients on a LAN to dial-out to remote clients through remote line servers. The current invention allows inexpensive packet-switched networks such as the Internet to be used to access and control remote line servers. Under the control of the local client the remote line servers are caused to make a call connection to a remote client across an analog subscriber line. Unlike prior art techniques which require a dial-out connection between a local client and a remote client to be made over a dedicated circuit-switched connection, the current invention allows all but the last leg of the call to be made over packet-switched networks. This reduces the cost of the call, because the bandwidth of most of the physical circuits required to support the call is reduced.

A typical scenario involves clients on a domestic LAN accessing their counterparts, e.g. remote clients, located at a foreign subsidiary. The call setup, i.e. dial-out is initiated by a local clients; passed over a packet switched network, e.g. the Internet, to a line server located locally in the foreign country. The line server establishes a connection over analog lines between its modem and the modem of the client, i.e. the remote client, located at the foreign subsidiary.

The call requires no modem at the local client, or the local packet processor.

Figure 1A:
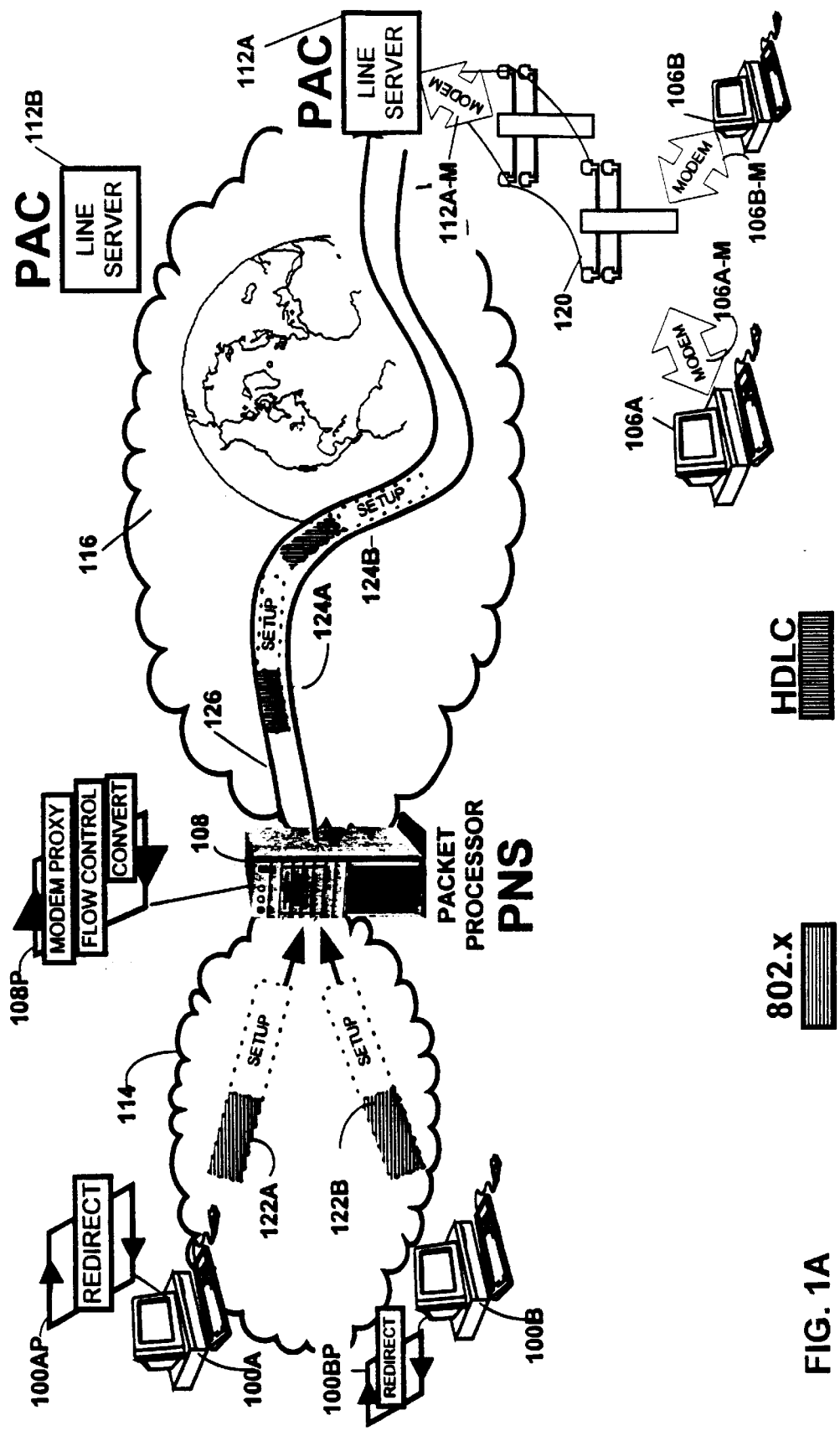
FIGS. 1A–D show various stages of a remote dial-out from clients in a virtual private network.

FIGS. 1A–D show the sequence of events associated with call setup and data transfer in an embodiment of the current invention. FIG. 1A shows a plurality of clients 100A–B, a packet processor 108, line servers 112A–B and a plurality of clients 106A–B.

Clients 100A–B interface with packet processor 108 through network 114. Network 114 in an embodiment of the invention is a local area network (LAN). The local area network allows clients to communicate with one another by sending packets wrapped with a source and destination address. The packets may be configured in any one of a number of protocols including I.E.E.E. 802.x established by the Institute of Electrical and Electronic Engineers LAN/MAN Standards Committee (Project 802). The packet processor 108 is connected to the line server 112A via a channel 126 on wide area network (WAN) 116.

The wide area network can, for example, include the PSTN and specifically an all-digital telephone network, known as the ISDN. The ISDN has become a potential substitute for the private long distance lines currently used by bridges and routers. The ISDN also provides relatively high speed digital transmission service on an "as needed" basis, and is different from LAN transmission media in that it is a circuit switched transmission media which provides a point-to-point transmission service on an intermittent basis. ISDN enables local area networks to be interconnected with each other to form a WAN. The ISDN network architecture is based on standards set by International Telecommunications Union (ITU) with standards in the United States largely driven by Bellcore. Two types of ISDN service are available: Basic Rate ISDN (BRI) and Primary Rate ISDN (PRI). BRI delivers two B-channels, each having a capacity of 64 Kbps and a 16 Kbps D-channel. PRI provides twenty three B-channels of 64 Kbps and a 64 Kbps D-channel. The D-channel is used for signaling between the central office switch and terminating equipment which could be a telephone set, personal computer, video-conferencing set or other device. The B-channels are used for any kind of service including voice data and video.

In contrast to packet based communications in which all packets contain a destination address, no such requirement exists for point-to-point communications on WAN 116, because a channel 126 is established between source and destination at the start of the session. Line server 112A may, in an embodiment of the invention, be coupled to clients 106A–B by analog subscriber line 120. The analog subscriber line may include the plain old telephone service (POTS) portion of the PSTN. In order to communicate digital data over analog subscriber line 120, both the line server 112A, as well as each of clients 106A–B has a corresponding modem respectively, 112A–M, 106A–M, and 106B–M.

In contrast to communication on a local area network in which packets may be sent at any time between any of the nodes on the network, the communications on both the WAN 116 and subscriber lines 120 require call setup. Call setup refers to the establishment of a point-to-point link between, packet processor 108 and line server 112A, or between line server 112A and client 106A. Call setup between modems 112A–M and 106A–M involves the allocation by the central office of a DS0 from the calling to the answering modem, a network interaction phase, a probing and ranging phase, an equalizer and echo canceler training phase, and a final training phase.

The current invention allows a local area network to be extended into a virtual private network through point-to-point connection established between the packet processor 108 and line server 112A and from the line server 112A to any one of a plurality of remote clients 106A–B. The current invention also allows clients on a LAN to control call setup on remote line servers, e.g. line server 112A. The current invention reduces the hardware cost associated with providing dial-out capabilities to clients on a local area network because no modems are required on either the client or the packet processor. Also, the current invention reduces. the cost associated with accessing remote clients 106A–B. Instead of placing a long distance call from client 100 directly to client 106A, a call can be initiated on LAN 114, passed over WAN 116, e.g. the Internet, and be completed on a final leg at local toll rates from a line server 112A at a remote location to remote client 106A.

Each of the clients 100A–B runs respectively processes 100AP–100BP while packet processor 108 runs modem proxy processes 108P. The client processes redirect communications from generic dial-out software on the clients 100A–B to modem proxy processes 108P on packet processor 108. Neither of the local clients 100A—B nor the packet processor 108 has actual modem hardware on it. Instead, the modem proxy processes 100AP–100BP and 108P spoof the performance of an actual modem for each of the local clients. In FIG. 1A, clients 100A and 100B are shown transmitting call setup packets respectively 122A–B to packet processor 108. The modem proxy processes on the packet processor simulate the behavior of an actual modem, to each of the clients 100A–B. The packet processor processes additionally decide which line server among the plurality of line servers 112A–B provides local access call rates to the remote client being contacted. In the example shown, the modem proxy processes have determined on the basis of a number dialed on clients 100A and B that a line server 112A is the appropriate line server to handle a call to remote clients 106A–B. Therefore, modem proxy processes establish a channel 126 between packet processor 108 and line server 112A. Next, a portion of the setup parameters received from either of clients 108A–B is passed along the channel 126 in the form of setup packets 124A–B to line server 112A. A tunnel is said to be formed along channel 126 when a plurality of independent call sessions occupy a single channel.

Figure 1B:
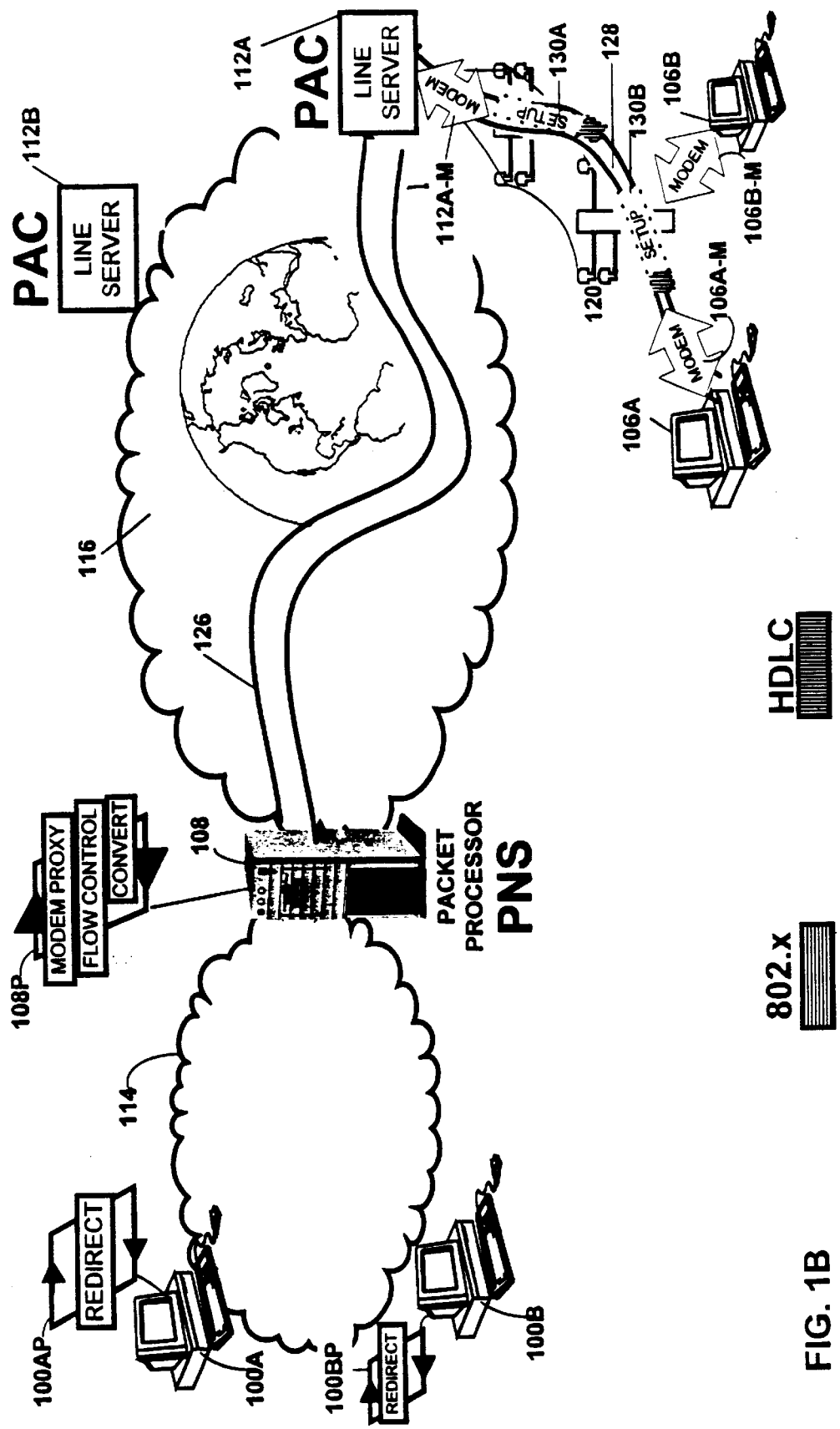

FIG. 1B shows a subsequent status of call setup in which the line server 112A utilizes the number provided in the setup packets 124A–B to setup channels, e.g. DS0s 128 between each of remote clients 106A–B and the remote line server 112A. The line server then utilizes its modems 112A–M to handle the network interaction, probing and ranging, equalizer and echo canceler training and final training phases of call setup between itself and each of modems 106A–M and 106B–M. During the final phases of a setup/parameter packets 130A–B are passed between the corresponding modems which contain the negotiated parameters for each of the call sessions.

Figure 1C:
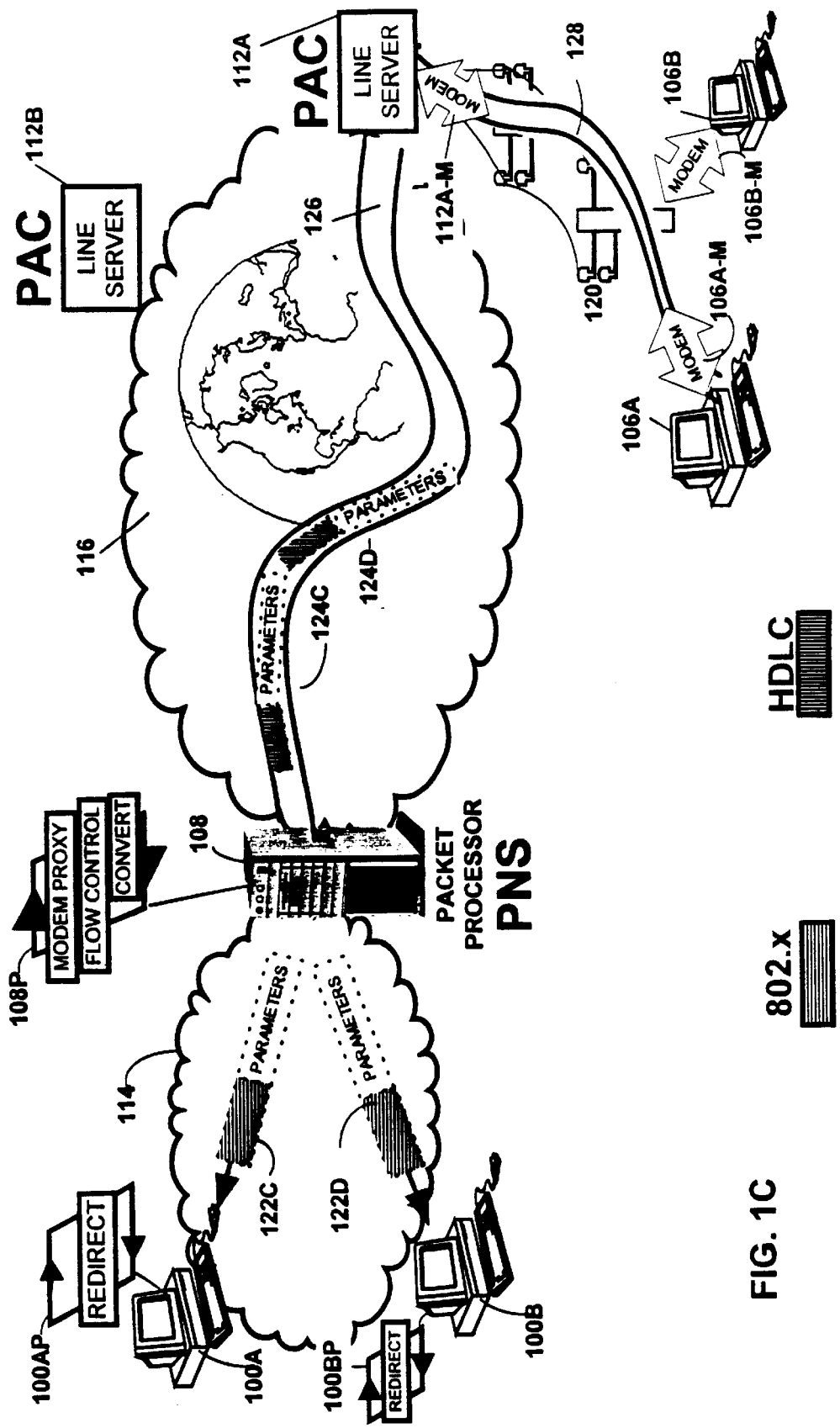

FIG. 1C shows the LAN 114 extended along virtual private link channels 126 and 128 from clients 100A–B to respectively remote clients 106A–B. Line sever 112A passes parameter packets 124C–D to packet processor 108 after the establishment of a point-to-point link between modem pool 118A–M and each of modems 106A–M and 106B–M. These parameters are passed by the packet processor modem proxy processes 108P in the form of packets 122C–D to respectively communication processes 100AP and 100BP on clients 100A–B, respectively.

Figure 1D:
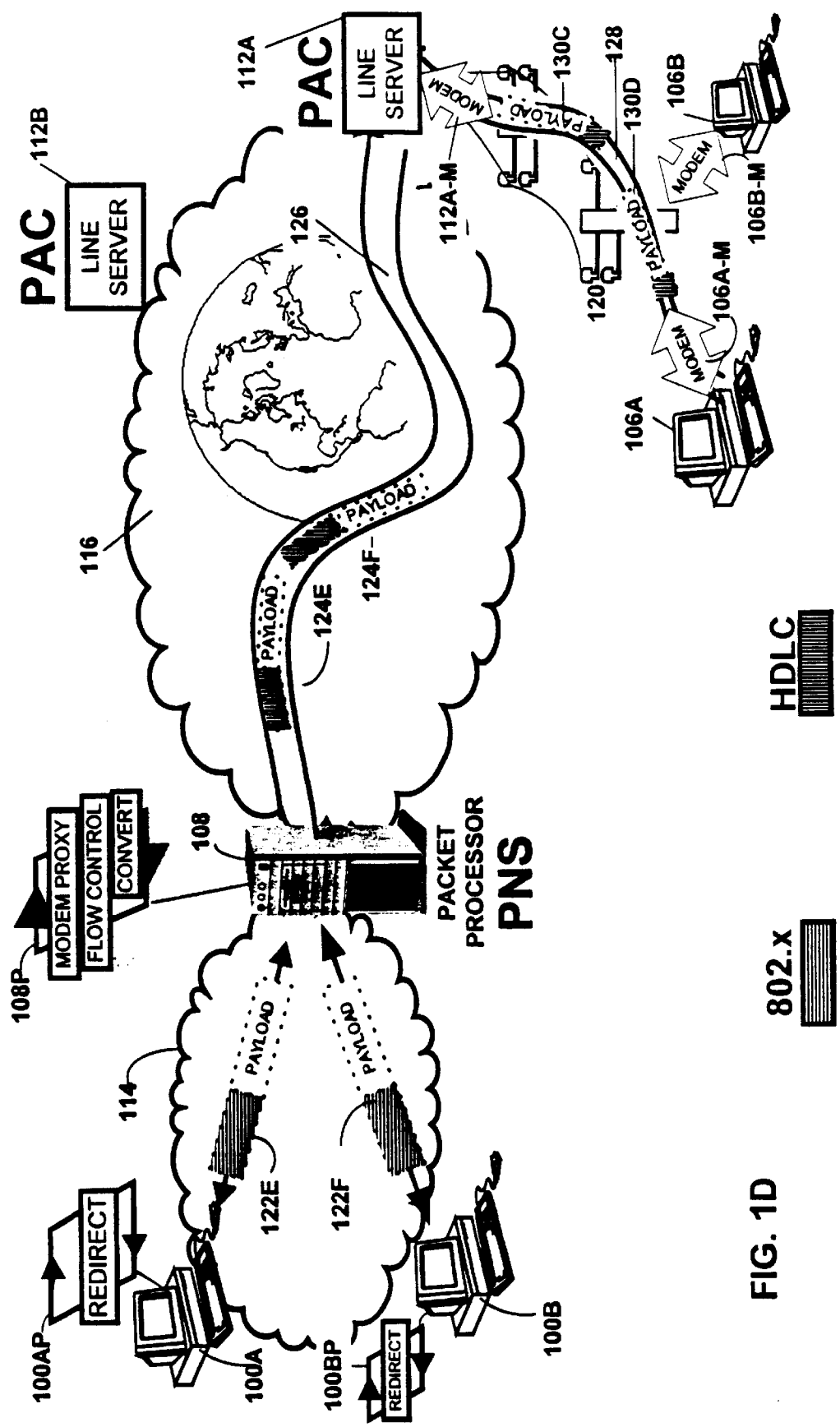

FIG. 1D shows actual data transfer subsequent to a call setup between clients 100A–B and remote clients 106A–B. Packets 122E–F are passed between respectively clients 100A–B and packet processor 108. Corresponding payload packets 124E–F are passed from packet processor 108 to line server 112A. Corresponding payload packets 130C–D are passed between line server 112A and clients 106A–B, respectively..

As discussed above, the first of the features associated with the modem proxy processes 108P is to serve as a modem proxy. Secondly, the packet processor has the ability to distinguish between packets 122A–D which contain call setup parameters from packets 122E–F which contain data. Thirdly, the packet processor may in certain embodiments of the invention implement both outbound and inbound flow control. Since the data transfer rate across LAN 114 will be faster than the data transfer rate across both of channels 126 and 128, it will, in certain embodiments, be necessary to implement flow control for both outgoing packets from client 100A–B to remote clients 106A–B, as well as incoming packets from the remote clients 106A–B to clients 100A–B. These flow control processes will be set forth in FIGS. 9A–C. Fourthly, certain embodiments of the invention may include modem proxy processes 108P for distinguishing different payload protocols emanating from either of local clients 100A–B and converting those to a payload format suitable for the remote line servers 112A–B. Conversely, similar capability exists for incoming packets from the remote line server which may require payload stripping or rewrapping in order to be compatable with local clients 100A–B. These processes are set forth in the following figures and accompanying text and in particular FIGS. 2A, 7A–B, 8A–B.

Protocols

Information transferred across networks does so with wrapping protocols for the information being transferred. Each packet contains a plurality of headers and payload. The headers contain information specific to one of the corresponding seven layers of the OSI model. FIGS. 2A–D, 3A–C and 4 show an embodiment of the packet protocols on respectively, the LAN 114, the WAN 116, and the analog subscriber line 120 (See FIGS. 1A–D). Headers and payload on a LAN are referred to as a packet. Headers and payload on an ISDN are referred to as frames. Until recently network traffic on either a LAN or ISDN network comprised packets/frames with up to seven headers, and a payload. The headers contained information specific to each of the seven layers of the OSI model. The payload contains the audio, video, or data being transferred. On the LAN the structure of headers and payload is specified by the respective IEEE LAN standard such as 802.3, 802.5 etc. These standards are hereinafter referred to as 802.x. On the ISDN side the structure of the headers and payload is specified by the PPP protocol or the High-Level Data Link Control (HDLC) protocols promulgated by the International Standards Organization (ISO).

Both IEEE 802 LANs and ISDN are structured by architecture closely following the Open Systems Interconnection (OSI) Seven Layer Reference Model. The OSI model decomposes a communication system into seven major components or layers which are defined by international standards. The OSI model is concerned with the interconnection between systems, i.e., the way they exchange information, and not with the internal functions that are performed by a given system. Communications between systems are organized into information that is exchanged between entities at each layer. The mechanism for communication between two systems at a single layer is referred to as a protocol, i.e., "a layer x protocol."

The first layer is known as the physical layer and is responsible for the transmission of bit streams across a particular physical transmission medium. This layer involves a connection between two machines that allows electrical signals to be exchanged between them.

The second layer is the data link layer (DLL), and is responsible for providing reliable data transmission from one node to another and for shielding higher layers from any concerns about the physical transmission medium. It is concerned with the error-free transmission of frames of data.

The third layer, the network layer (NL), is concerned with routing data from one network node to another and is responsible for establishing, maintaining, and terminating the network connection between two users and for transferring data along that connection. There is normally only one network connection between two given users, although there can be many possible routes from which to choose when the particular connection is established.

The fourth layer is the transport layer (TL), and is responsible for providing data transfer between two users at an agreed on level of quality. When a connection is established between two users, the transport layer is responsible for selecting a particular class of service to be used, for monitoring transmissions to ensure the appropriate service quality is maintained, and for notifying the users if it is not.

The fifth layer is the session layer, and it focuses on providing services used to organize and synchronize the dialog that takes place between users and to manage the data exchange. A primary concern of the session layer is controlling when users can send and receive, based on whether they can send and receive concurrently or alternately.

The sixth layer is the presentation layer, and is responsible for the presentation of information in a way that is meaningful to network users. This may include character code translation, data conversion or data compression and expansion.

The seventh layer is the application layer, and it provides a means for application processes to access the system interconnection facilities in order to exchange information. This includes services used to establish and terminate the connections between users and to monitor and manage the systems being interconnected and the various resources they employ.

FIG. 2A shows a detailed view of one of the possible packet types 122 which can be transmitted over LAN 114 [see FIGS. 1A–D]. The details of the wrappers for packet 122 are shown. Specifically, the protocol for this packet conforms with the IEEE 802.3 specification. The 802.3 packet begins with a preamble 200. The preamble is seven bytes in length with each byte containing the bit pattern 10101010. The preamble allows the receiver's clock to synchronize with the sender. Next comes the start of frame flag 202 containing the binary sequence 10101011. Next is the destination address 204 which is six bytes in length followed by a source address 206 which is also six bytes in length. The length field 208 follows. The length field which is two bytes in length indicates how many bytes are present in the data/payload field from a minimum of zero to a maximum of 1500 bytes. Headers 210–214 contain respectively the network layer, transport layer, and session layer headers for the payload field 216. The payload may contain various types of information including: modem session setup commands, session parameters, or data. Data may be audio, video, or textual. Immediately following the payload is checksum field 236.

FIGS. 2B–C show details of alternate protocols for payload field 216 shown in FIG. 2A. FIG. 2B shows a payload field which contains a raw data field 230.

FIG. 2C shows a payload field 216 which includes an HDLC wrapper. Some operating systems such as, for example, Win 95® also wrap the payload with a high level data link control wrapper (HDLC). Specifically, the network transport and session headers, respectively 224–228, and raw data field 230 are wrapped in an HDLC frame. The HDLC frame is initialized and terminated with start of frame and end of frame flags respectively 218, 234 which contain a fixed predetermined binary sequence. Following start of frame flag 218 at the beginning of a packet is an address field 220 one byte in length. The address field is primarily of importance on lines with multiple terminals where it is used to identify one of the terminals. It is also sometimes used to distinguish commands from responses. Immediately following the address field is a control field 222 also one byte in length. The control field is used for sequence numbers, acknowledgments and to distinguish between information, supervisory and unnumbered frames. Headers 224–230 which are 64 to 1,518 bytes in length follows the control field. Raw data field 230 includes various forms of information such as: session setup, session parameters, or raw audio, video, or textual data. Immediately following the payload field is the check sum field 232. The check sum field is a minor variation on the well known cyclic redundancy code using CRC-CCITT as the generator polynomial. The variation is to allow lost flag bytes to be detected. The flags 218, 234 contain the bits 01111110.

To avoid emulation of the flag bits and therefore possible confusion as to the start and stop of a frame, a protocol called bit and/or byte stuffing is utilized in which sequences identical to the flag sequence found in the payload portion are altered during the creation of an HDLC frame and transmitted in the altered form thus avoiding emulation. Upon receipt of the HDLC frame at stuffing at either a bit or a byte level is detected and payload is returned to its original condition.

FIG. 2D shows details of an embodiment of the transport layer/header/field 212. The embodiment shown in FIG. 2D implements the transmission control protocol (TCP) which has become a standard for the Internet. Each machine supporting TCP has a TCP transport entity that manages TCP streams and interfaces with the Internet protocol (IP)—protocol which is implemented in the network layer header 210. The TCP header contains the information necessary to make sure information is properly delivered and retransmitted, if necessary, to make sure that information is received in the proper order.

The first of the TCP fields are fields 250–52, respectively the source and destination port. These identify the local end points of the connection. Each host may decide for itself how to allocate its port starting at acknowledgment field 256. A port plus its host IP/network layer address performs a 48-bit unique transport service access point (TSAP). To obtain TCP service, a connection must be explicitly established between a socket on the sending machine and a socket on the receiving machine. A socket may be used for multiple connections at the same time. In other words, two or more connections may terminate at the same socket. In accordance with the current invention, a unique socket number is assigned to all remote dial-up packets between either of clients 100A–B and packet processor 108. Field 254 the sequence number field establishes the ordering for packets in a session. Acknowledgment field 256, the acknowledgment field, specifies the next byte expected. Both fields 254 and 256 are 32-bits long because every byte of data is numbered in a TCP stream. Fields 258 define both the length of the header as well as having a series of control bits. Field 260, the windows size field is used in conjunction with acknowledgment field 256 to provide flow control capability. For example, a window field value of 0 and an acknowledgement field value of N+1 indicates that N bytes of information have been received but the receiver would like no more data to be sent for the moment. Permission to send may be granted in a later packet by sending a packet with the same acknowledgment number but a non-zero window field. The next field 262 is the checksum field. This field is provided for reliability. The next field 264 may include a pointer to a portion of the raw data field 230 which contains urgent data, and an option field to provide additional control capability and a data field.

FIG. 3A shows the overall construction of a packet 124 on WAN 116 adhering to the point-to-point protocol (PPP). A PPP frame is character oriented. Character stuffing is used on dial-up modem lines so that all frames are an integral number of bytes. It is not possible to send a frame consisting of 30.25 bytes as it is with HDLC. The PPP packet 124 begins with the standard HDLC flag 302. The flag consists of the bit sequence (01111110) which is character stuffed if it occurs within the fields 310–320. Next is the address field 304 which is always set to the binary value 11111111 to indicate that all stations are to accept the frame. Using this value avoids the issue of having to assign data link addresses. The next field is the control field 306. The default value of which is 00000011. This value indicates an unnumbered frame. In other words, PPP does not provide reliable transmission using sequence numbers and acknowledgments as the default. In noisy environments such as wireless network reliable transmission using numbered mode can be utilized as detailed in RFC 1663. The fourth PPP field is the protocol field 308. Its job is to tell what kind of packet is in the payload field. Codes are defined for LCP, NMC, IP, IPX, Apple Talk, and raw or HDLC framed data as discussed above in connection with FIGS. 2B–C. Following the protocol field 308 are one or more series of network, transport, and session headers, respectively 310–314 and 316–318. The network header field 310 contains information which identifies whether the following field, i.e. the transport header 312 implements a GRE or TCP header. Next is the control/raw data field 320. Field 320 may contain either control data such as "AT" and modem set-up command strings or session parameters for modems. Alternately, the control/raw data field 320 may contain data. The data may be part of a call session between either of remote clients 106A–B and clients 100A–B (see FIGS. 1A–D) or may be data originating from other nodes on the wide area network 116 which do not involve modems. After the payload fields comes the checksum field 322. After checksum field comes the end of frame flag 324 which contains the same bit sequence as the starter frame flag 302.

FIGS. 3B–C show details of the transport layer header 312 which is key to establishing a PPTP control connection. There are two parallel components of PPTP: 1) a Control Connection between each packet processor and line server pair operating over TCP and 2) an IP tunnel operating between the same PAC-PNS pair which is used to transport GRE encapsulated PPP packets for user sessions between the pair. The GRE and TCP transport layer headers are shown in respectively FIGS. 3B–C. For each PAC-PNS pair both a tunnel and a control connection exist.

FIG. 3B shows the transport layer header 312A which utilizes a generic routing encapsulation (GRE) header set forth in the PPTP draft section 4.1 for the tunnel connection. The GRE header allows a plurality of sessions to be tunneled through a single channel 126 (see FIGS. 1A–D). The GRE header includes a control bit fields 350. The next field 354 is the protocol field which can be used to indicate whether the data in the control/raw data field 320 is HDLC framed or not. The next field 356 is the payload length field which indicates the size of the fields 314–320 excluding the GRE header. The next field 358 is the caller I.D. field. This field contains the peers caller I.D. session to which this packet belongs. The following field 360 contains the sequence number of the payload. The next field 362, the acknowledgment number field contains the sequence number of the highest numbered GRE packet received by the sending peer for this user session. The GRE header is appended to PPTP packets after the call set-up and parameter passing stages shown in FIGS. 1A–C have been completed. Thus, the GRE header is utilized when data is being transferred.

Before PPP tunneling can occur between a line server and packet processor, a control connection must be established between them. FIG. 3C show a transport header which utilizes a TCP protocol 312B. The TCP protocol is utilized during call set-up and parameter passing in the transport layer header 312 (See FIG. 2D and accompanying text). The control connection is a standard TCP session over which PPTP call control and management information is passed. The control session is logically associated with, but separate from, the sessions being tunneled through a PPTP tunnel. The control connection is responsible for establishment, management, and release of sessions carried through the tunnel. The source field 370, the destination field 372, the sequence # field 374, the acknowledgement # field 376, the length and control bits fields 378, the window size field 380, the checksum field 382 and the urgent pointer field 384 are shown.

Figure 4:
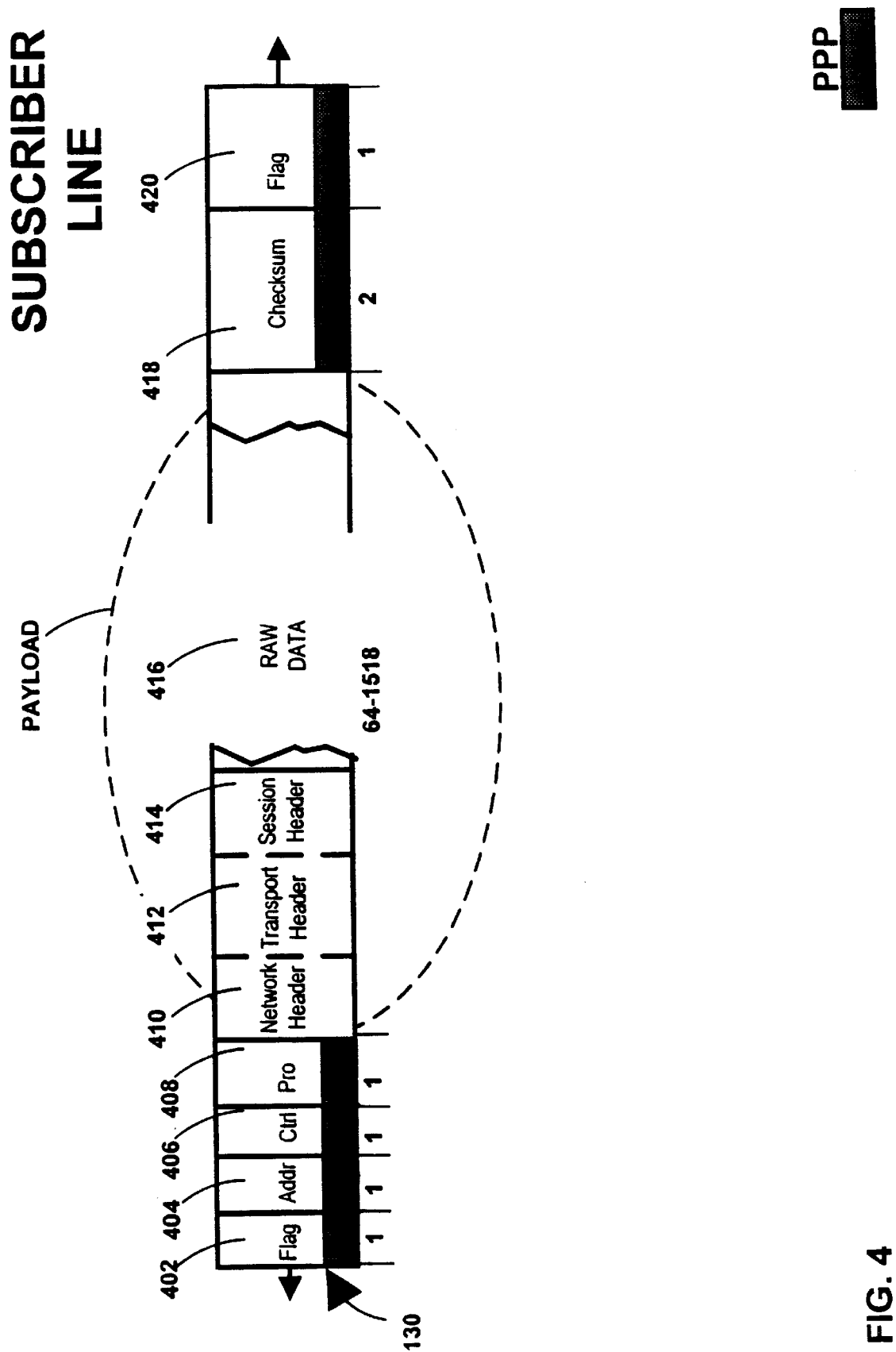

FIG. 4 shows a detailed embodiment of the packets 130 (see FIG. 1D) passed between remote line server 112A and either of remote clients 106A–B. That packet implements PPP protocol and is therefore identical to that described and discussed above in connection with FIG. 3A. The packet includes: start frame flag 402; address field 404, control field 406, protocol field 408, network header 410, transport header 412, session header 414, raw data 416, checksum 418, and end of frame flag 420.

Hardware

Figure 5:
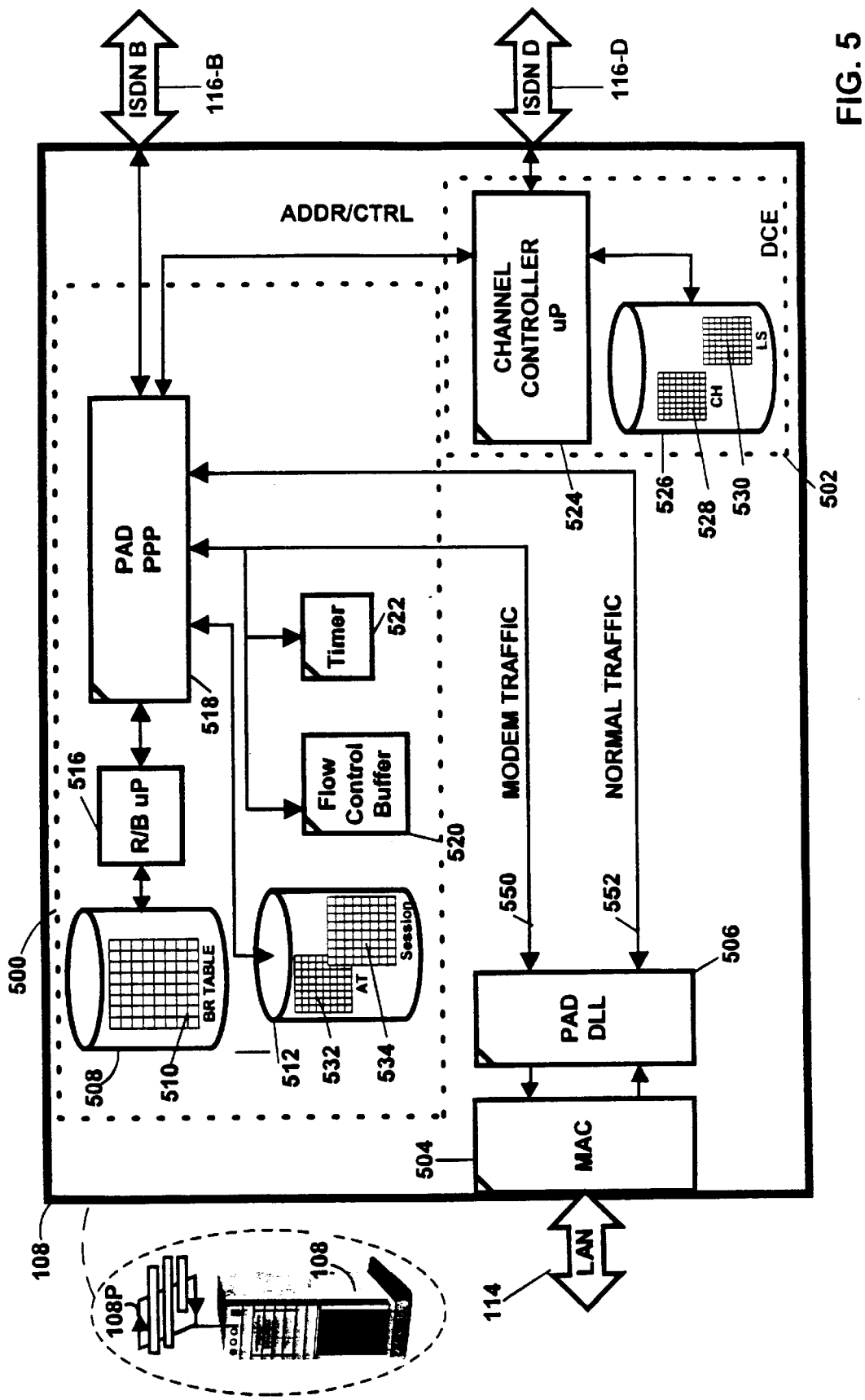
FIG. 5 is a hardware block diagram of an embodiment of the packet processor which allows clients in a virtual private network to dial out through remote line servers.

FIG. 5 shows an embodiment of the hardware associated with the enhanced packet processor 108 [see FIGS. 1A–D]. The packet processor includes a medium access control (MAC) controller 504 and a data link layer (DLL) packet assembler and disassembler (PAD) 506, a bridge/router 500 and a channel controller 502. The bridge/router 500 includes an PPP PAD 518, a router/bridge controller 516, memories 508, 512, a flow control buffer 520, and a timer 522. The channel controller includes a channel controller 524 and a memory 526.

MAC controller 504 is connected to LAN 114 (See FIGS. 1A–D). DLL PAD 506 is connected to the MAC controller. The DLL PAD is connected to the PPP PAD 518 by either of two signal lines 550–552. The channel controller 524 is connected to the ISDN-D line 116-D. The D-channel is used for signaling between the central office switch and terminating equipment which could be a telephone set, personal computer, videoconferencing set or other device. The channel controller 524 is also connected to memory 526, as well as to the PPP PAD 518. The ISDN-B line 116B is connected to the PPP PAD. The B-channels are used for any kind of service including voice data and video. The PPP PAD is connected to the router/bridge controller 516, to memory 512, timer 522 and flow control buffer 520. The bridge/router controller is also connected to memory 508.

Normal Traffic

In operation, incoming LAN 114 packets are received by the packet processor 108 at the MAC controller 504. The MAC controller compares the packets DLL destination address 204 (see FIG. 2A) with its own identification. If the destination address matches the MACs address the packet is accepted. The MAC controller verifies the integrity of an accepted packet by independently computing check sum and comparing this computed check sum to the check sum field 212 (see FIG. 2A) of the DLL header. The packet is then passed to the DLL PAD 506 for further processing. The DLL PAD determines which of 256 possible ports the payload should be sent to on the basis of a port and socket identifier contained within field 252 (See FIG. 2D) of the transport header of the incoming packet. Traffic for one port will be subject to remote call processes 108P, while packets to other ports will not. Thus, when clients 100A–B and packet processor 108 setup a call, conduct, and terminate a call session they do so with packets which have a unique port and socket. LAN traffic which has a port and socket associated with remote modem operation will be passed from DLL PAD 506 along signal line 550 to PPP PAD 518. LAN traffic which has a port and socket associated with normal gateway traffic will be passed along signal line 552 to the PPP PAD.

Normal gateway traffic passing from LAN 114 via signal line 552 is received at PPP PAD 518. The PPP PAD copies the network layer header and passes this header (router function) and or MAC address (bridge function) to the router/bridge controller 516. The bridge/router controller performs as a bridge by comparing the MAC address to MAC entries in a bridge/router table 510 and passing those packets to WAN 116 which have a MAC address corresponding to a MAC address for a WAN node recorded in the bridge/router table. Packets whose MAC address do not correspond to an entry in the table are rejected. Rejection is implemented when a reject signal is passed from router/bridge controller 516 to PPP PAD 518, causing further processing of the packet to be terminated.

Alternately, if a routing function is being performed, the network layer destination header may be rewritten by router/bridge controller 516 on the basis of an entry/path in bridge/router table 510 as determined by router/bridge controller 516. This updated routing information, in the form of a revised network destination address, is sent by the bridge/router controller to the PPP PAD 518, and is written into the source address field within the network header field 310 of the PPP frame [see FIG. 3A]. The PPP PAD then performs anti-emulation processing in the form of bit or byte stuffing on the payload to assure that the flag sequence will not be emulated by any bytes of the payload. The PPP PAD then computes the payload check sum and makes a corresponding entry in checksum field 322 (see FIG. 3A) of the PPP frame. The remaining fields of the PPP frame specifically; flags 302, 324, address field 304, control field 306 and protocol field 308 are then added to the payload and check sum. The destination address is passed from PPP PAD to channel controller 524. The channel controller, based on entries within sessions/channel table 528 within memory 526, determines which of the outgoing channels of the ISDN-B line 116-B the PPP frame should be placed on and sends a corresponding control signal to PPP PAD to send the frame. This results in the PPP frame being placed on the appropriate channel within the ISDN-B signal line.

Modem Traffic

Outgoing LAN remote dial up modem traffic is handled differently than normal traffic. This traffic is passed from DLL PAD 506 along signal line 550 to PPP PAD 518. The PPP PAD obtains from the transport layer header 212 of the incoming payload and specifically from field 250 thereof (see FIG. 2D) the source port address. The PPP PAD then compares this source port address to the sources of modem traffic listed in the session table 534 within memory 512. The session table 534 contains a list of active sessions the parameters associated with those sessions, e.g. baud rate max and min, payload packet type, e.g. whether or not the payload is wrapped in an HDLC header (see FIG. 2C), whether or not flow control is enabled. For inbound flow control the session table contains the session buffer. For outbound flow control the session table contains the register and decrement amount for each session (See FIGS. 9A–D).

If there is no corresponding entry in session table 534 then the PPP PAD initiates a new session by processing the initial incoming packets as "AT" command script. During this processing the PPP PAD accesses "AT" table 532 within memory 512 to determine the appropriate response to each AT sequence. These responses are set forth in greater detail in FIGS. 9D–E. During the course of that start up processing the PPP PAD determines session parameters including phone number, maximum and minimum baud rate, and payload packet protocol. Payload packet protocol refers to the determination by the PPP PAD on the basis of a receipt of a plurality of packets as to whether or not the client from whom the packets are being received is implementing HDLC wrapping at a payload level (see FIG. 2C). Flow control assures the reliability and integrity of outgoing and incoming traffic (see FIGS. 9A–C).

During the initial setup phase the PPP PAD emulates a generic modem by sending responses to the client 100A/B which mimic the behavior of an actual modem (see FIG. 10D). When the dial-out number is obtained, the PPP PAD 518 passes that dial-out number to-the channel controller 524. The channel controller processor accesses the line server table 530 within memory 526 to determine which remote line server can connect to the number at local, as opposed to, long distance rates. The line server table may contain, in an embodiment of the invention, a list of worldwide area codes and for each area code, and/or area code and city code, the destination address and/or phone number of a corresponding line server. The line server table may additionally include information as to the parameters of each remote line server including: packet protocols supported, maximum and minimum baud rates.

Once an appropriate remote line server has been determined, the channel controller accesses the channel table 528 to determine whether an existing communication channel exists between the packet processor 108 and the appropriate line server, e.g. 112A. If such a channel does not exist then the channel controller 524 opens such a channel by accessing the ISDN-D line 116-D and passing the appropriate information to the PSDN central office. This results in a channel being allocated between the packet processor and line server and this channel is recorded in the channel table 528. Once a channel has been identified or located the channel controller signals the PPP PAD 518 which then places a PPP packet 124A–B (see FIG. 1A) on the channel 126 (see FIG. 1A).

The remote line server then attempts to extend the virtual channel to whichever of remote clients 106A–B corresponds to the dialed phone number. The line server then sends a confirming setup packet to the packet processor 108. The line server then sends a session parameter packet 124C–D (see FIG. 1C) which is received by the packet processor 108. The parameters for the session, e.g. baud rate, are written into the session table 534 and passed to whichever of clients 100A–B initiated the call sessions. With the call session thus established the packet PPP PAD processes all subsequent packets between the local client and remote client by stripping any payload wrappers (see FIG. 2C) and by performing outgoing and incoming flow control. These processes as well as call termination will be described in greater detail in the following figures and accompanying text.

Figure 6:
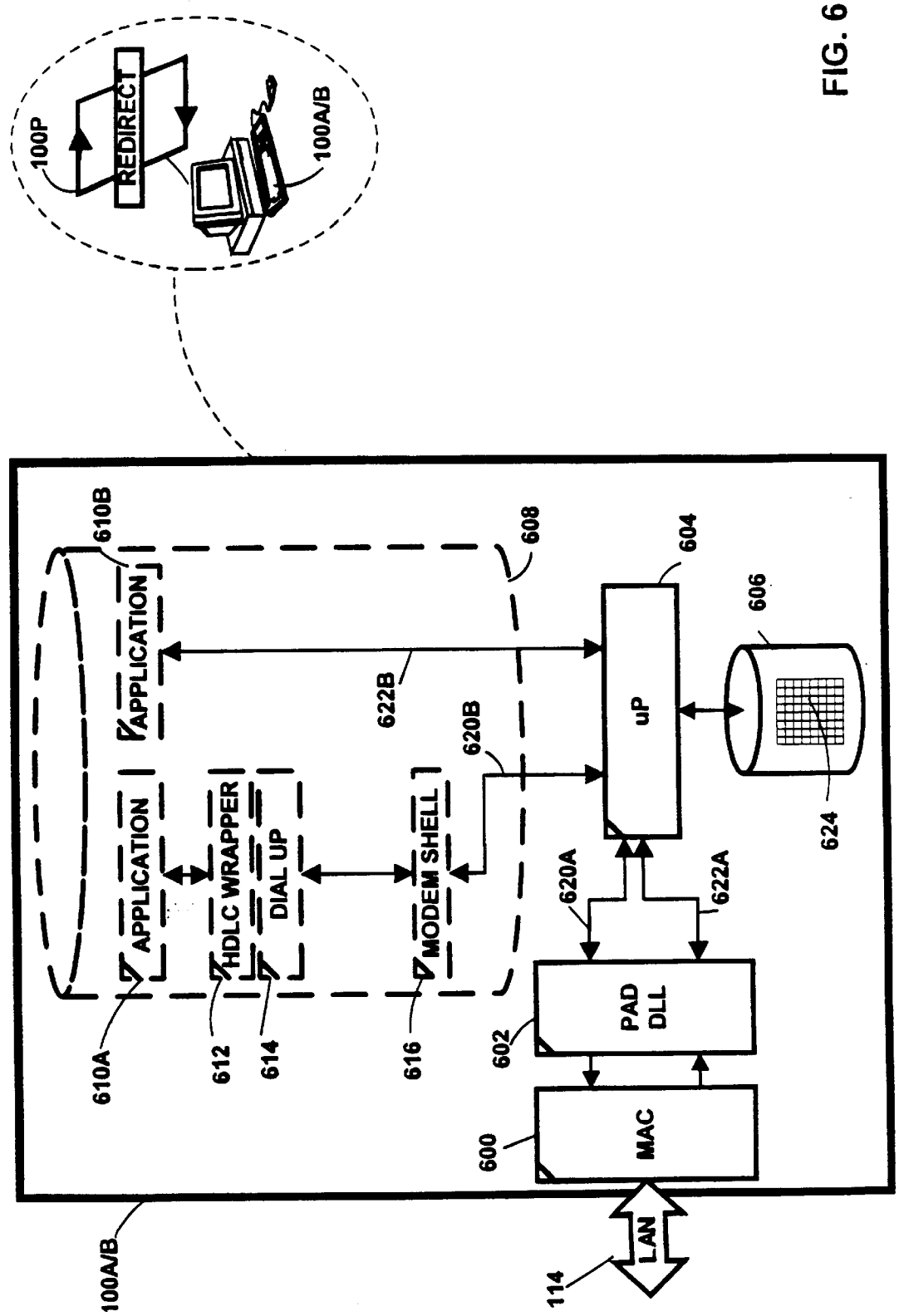
FIG. 6 is a hardware block diagram of a client configured to communicate with the packet processor shown in FIG. 5.

FIG. 6 shows the hardware and software modules associated with each of local clients 100A/B. The local client includes a MAC controller 600, DLL PAD 602, microprocessor 604 and nonvolatile and volatile memories respectively 606–608. MAC controller 600 is connected to LAN 114 (see FIGS. 1A–D). DLL PAD 602 is connected to the MAC controller. The DLL PAD is connected to the microprocessor by either of two communication paths, 620A–622A. The microprocessor is connected to nonvolatile memory 606. The microprocessor 604 is also connected via at least two communication paths 620B–622B with volatile memory 608.

In operation when clients 100A–B boot up, applications 610A–B are retrieved from one or more files 624 in nonvolatile memory 606 and rendered operational within volatile memory 608. In the example shown, application 610A is an application that requires communication with a modem while application 610B is, for example, a word processing application which requires no modem connection. Both applications in the example support communication over the LAN 114.

Modem traffic to or from application 610A is assigned a specific port and socket number which allows it to be separated from normal traffic and subject therefore to different processes. Modem traffic passes between application 610A and LAN 114 via communication paths 620A and 620B. Normal traffic between application 610B and LAN 114 is assigned a different port and socket number and passes on communication paths 622A and 622B between the application 610B and LAN 114.

When application 610A initiates a call setup the call request may be passed through an optional HDLC framing module 612. This module is present for example in Win95™ dial up network (DUN). This module 612 causes outgoing payload to be placed in an HDLC wrapper. Whether or not this module is present the call setup packet is then passed to a dial up module 614. The dial up module may include any one of a number of off the shelf communication packages such as CrossTalk. In order to mimic modem behavior without actually having any on-board modem hardware, a modem shell 616 is provided. This module intercepts communication from dial up module 614 and redirects them to LAN 114 and specifically to packet processor 108. This module operates at the transport and network layer levels. It causes specific port and socket numbers to be appended to outgoing packets which therefore follow communication paths 620B and 620A from local client 100A to LAN 114. Incoming packets with the unique port and socket number associated with modem traffic are intercepted by this module and passed to the dial up module 614 which in turn interfaces with application 610A. Thus, the modem shell 616 in conjunction with the modules resident on packet processor 108 allows application 610A to communicate with remote clients 106A–B, via remote line server 112A. Clients 100A/B are therefore able to dial remote clients without any resident modem hardware and to access those remote clients at local toll rates through remote line servers.

FIG. 7 is a stick diagram which shows the sequence of events associated with dial-out from a local to a remote client. Processing begins with a start control connection request packet 702A sent from the packet processor to the line server. Before PPP tunneling can occur between a packet processor and a line server, a control connection must be established between them. The control connection is a standard TCP session over which PPTP call control and management information is passed. The control session is logically associated with, but separate from, the sessions being tunneled through a PPTP tunnel. The control connection is responsible for establishment, management and release of sessions carried through the tunnel. It is the means by which the line server is instructed to place an outgoing dial call. (See PPTP specification Section 2.1). The connection request lists the capabilities of the packet processor 108, including DNS name framing capabilities, maximum number of channels, etc. In response, the packet processor receives from the line server a start control connection reply packet 702B which lists the corresponding capabilities for the line server 112A. These result in the channel 126 being created between the packet processor and line server (see FIGS. 1A–D). The channel may be permanently in place or may be activated in response to a dial up request from client 100A. Then client 100A sends a series of setup packets 704 to the packet processor 108. These packets contain "AT" command strings for initiating call setup. These command strings are extracted and parsed from the incoming land packet by the packet processor and converted into an outgoing call request 706, which is passed from the packet processor to the line server. (See PPTP specifications Section 2.7). The outgoing call request packet contains the caller ID and serial number, the minimum and maximum bits per second, the phone number of remote client 106A and the packet processing delay. Upon receipt of the outgoing caller request packet the line server 112A conducts channel and modem setup processes 708. The line server first establishes a channel 128 (see FIGS. 1C–D) between itself and remote client 106A. In an embodiment of the invention this will correspond to the establishment of a DS0 over the subscriber lines 120 which connect the line server to the remote client (see FIGS. 1A–D). The line server then establishes a connection between modems 112A–M and 106A/M by conducting a modem start up session which culminates in the passing of setup/parameter packets 130A (see FIG. 1B) between the modems. Once a modem connection has been established and a virtual private network has been created between local client 100A and remote client 106A the line server passes an outgoing call reply packet 710 to the packet processor. (See PPTP specification Section 2.8). The outgoing call reply is received by the packet processor and converted by that packet processor into a corresponding set of call parameters. The call parameter packet 712 is passed from the packet processor to the local client 100A.

On receipt of the call parameter packet 712 the local client commences sending data packets 714 to the packet processor. The packet processor determines that the incoming packets are associated with this session which has already been setup. The packet processor therefore wraps the local client data both in a data link layer PPP header (see FIG. 3A), as well as at a transport layer a GRE header (see FIG. 3B). When these packets are received by the line server, the line server removes the PPP and GRE headers and wraps the payload in a PPP header (see FIG. 4). Data packets 718 are passed in this form between line server and remote client. Since the LAN 114 will typically be faster than either the WAN 116 or subscriber line 120 (see FIGS. 1A–D) segments outgoing flow control will be necessary. This function is performed by the packet processor. The packet processors monitors outgoing data flow and controls the behavior of client 100A with a clear to send bit (CTS). The CTS bit is part of the session layer header 214 shown in FIG. 2A. When the CTS bit is low, client 100A will stop sending data. When CTS is high, the local client will resume sending data. The packet processor by comparing the outgoing data flow with the baud rate established for the session and stored in the session table 534 (see FIG. 5) can control the behavior of the client. Return data from the remote client is passed in the form of client data packets 720 from the line server to the packet processor. These packets are wrapped in both a PPP DLL header, as well as a GRE transport layer header. When the packet processor 108 receives these packets it correlates them using the caller ID field 358 (see FIG. 3B) with particular local client and repackages them into a LAN packet 724 destined for the appropriate one of the local clients associated with the session, i.e. local client 100A. In the course of receiving incoming packets the packet processor implements full flow control by buffering the packets and passing them to client 100A only when a clear to send signal 722 is received from client 100A.

The termination of a session is initiated by client 100A sending escape sequence packets 726. These packets contain the payload string +++. The packet processor monitors all outgoing data packets from client 100A for this sequence and when a sufficient number of these are received followed by a hang up packet 728 which contains the AT command string "ATH" initiates session termination. The packet processor begins session termination by sending a clear call request 730 (see PPTP specification Section 2.12) to the line server. This and subsequent communication to the line server implement the TCP protocol in the transport layer header 312 portion of the PPP packet sent to the line server (see FIGS. 3A, C). Upon receipt of the request the remote line server terminates the modem communications 732 and channel 128 (See FIGS. 1B–D) between itself and the remote client 106A. This results in the deallocation of the channel, e.g. DS0 between the line server and the remote client. The line server then sends a disconnect notify packet 734 to the packet processor (see PPTP specification Section 2.13). In response, the local packet processor 108 sends a status disconnect data packet 736 to the local client 100A thus, confirming termination of the session.

In the event that local clients 100A/B are utilizing DUN capabilities of Windows95™ the payload portion of their LAN packets may be wrapped in a HDLC or PPP header (See FIG. 2C). Since the remote line server 112A is not equipped to know whether the payload that it is processing is wrapped in an HDLC header or not, it cannot adequately process packets destined for remote client 106. It is therefore necessary for the packet processor to detect payloads wrapped in an HDLC wrapper (see FIG. 2C) and to remove that wrapper before passing the payload to the line server. The presence/absence of payload wrapping of each local clients packets is recorded in the session table 534 (See FIG. 5) at the start of each session. Incoming traffic from the line server to the packet processor must be similarly processed. If an entry for the session in the session table indicates that payload wrapping with an HDLC header is expected by the local client then the packet processor must wrap the payload portion of incoming packets in order for them to be recognized by the local client.

FIGS. 8A–B show the processes performed on the packet processor 108 (see FIGS. 1A–D) for respectively, outgoing and incoming LAN traffic. Processing begins at start block 800 and proceeds to process 802. In process 802 the packet processor accepts packets which have a port and socket number indicating that they are modem traffic coming from one of the local clients. Control is then passed to decision process 804. In decision process 804 determination is made on the basis of the session table 534 (see FIG. 5) as to whether this is a new session or not. If a determination in the affirmative is reached then control is passed to the setup subroutine 806 (See FIGS. 9D–E). Upon return from the setup routine control is passed to process 808 in which parameters established during call setup between the line server and the remote client are stored in the session table 534 (see FIG. 5). Control is then returned to process 802.

Alternately if in decision process 804 determination is reached that the incoming modem traffic is from a local client which has established an existing session, then control is passed to process 810. In process 810 the session parameters are retrieved from the session table 534 (see FIG. 5) and control is passed to decision process 812. In decision process 812 a determination is made on the basis of a flow control entry in the session parameters as to whether outbound flow control has been activated for this session or not. In the event a negative determination is reached, then control is passed to subroutine 814, the outbound flow control subroutine which activates outbound flow control. Control returns from the subroutine to decision process 818. If alternately, in decision process 812 a determination is made that flow control for the session has already been initiated then control is passed to subroutine 816. In subroutine 816 the payload size of the incoming LAN packet is passed to the register dedicated for outbound flow control for the session. Control is then passed to decision process 818.

In decision process 818 a determination is made on the basis of values stored in the session table 534 (see FIG. 5) as to whether packets from the local client contain an HDLC payload wrapper. In the event this determination is affirmative, control is passed to process 824. In process 824 the HDLC header is stripped from the payload and control is passed to decision process 820. Alternately if in decision process 818 a negative determination is reached, i.e. that no HDLC payload wrapping is occurring then control is passed directly to decision process 820.

In decision process 820 a determination is made that may stretch over more than one frame as to whether an escape sequence and a "ATH" string is contained in the payload. In the event that determination is affirmative, then the local client is seeking to terminate the call session. Control is therefore passed to process 826. In 826, the transport layer header 312 (see FIG. 3A) is configured according to the TCP protocol (see FIG. 3C). Control is then passed to process 830. In process 830 a clear call request (See PPTP specification §2.12) is sent from the packet processor to the remote line server. Control then returns to process 802 for the receipt of the next modem traffic packet. If alternately in decision process 820 a negative determination is reached, i.e. that the payload does not contain a call termination sequence then control is passed to process 828. In process 828, GRE encapsulation (see FIG. 3B) is implemented in the transport layer header 312 of the WAN packet. Control then also returns to process 802 for the receipt of the next modem traffic packet from local client.

FIG. 8B shows processes associated with inbound tunnel traffic from WAN 116 to local packet processor 108 (See FIGS. 1A–D). Processing begins at start block 850 from which control is passed to process 852. In process 852 the destination port and socket for the incoming packet are obtained. Control is then passed to process 854. In process 854 the PPP PAD 518 utilizes the session table 534 to associate the incoming packet with a specific session. Control is then passed to decision process 856. In decision process 856 the determination is made on the basis of the parameters stored in the session table as to whether inbound flow control has been activated for this session. In the event that the determination is negative, control is passed to process 858 in which the inbound flow control processes shown in FIG. 9C are activated. Control is then passed to decision process 860. Alternately, in the decision process 856 if an affirmative determination is reached, i.e. that inbound flow control has been activated, then control is passed to decision process 860.

In decision process 860, a determination is made as to whether HDLC payload wrapping is implemented for this packet. This determination is made on the basis of information stored in the session table 534 (See FIG. 5) and obtained at the start of the session. In the event this determination is negative,, control passes to process 864. Alternatively if the decision in process 862 is affirmative then control is passed to process 862. In process 862 the payload is wrapped in an HDLC header (see FIG. 2C). Control is then passed to decision process 864.

In process 864 the payload portion of the incoming packet including any header, is added to the inbound flow control buffer for the session. Control is then passed to decision process 866. In decision process 866 a determination is made as to whether a disconnect notify packet (see PPTP specification section 2.13) has been received from the remote line server 112A. In the event that determination is affirmative, control is passed to process 868. In process 868, a status disconnect data packet is sent to the local client to confirm the termination of the session. The status disconnect data packet may be a part of the transport layer header 212 (See FIG. 2), which confirms the termination of the session. Control is then returned to process 852.

Figure 9B:
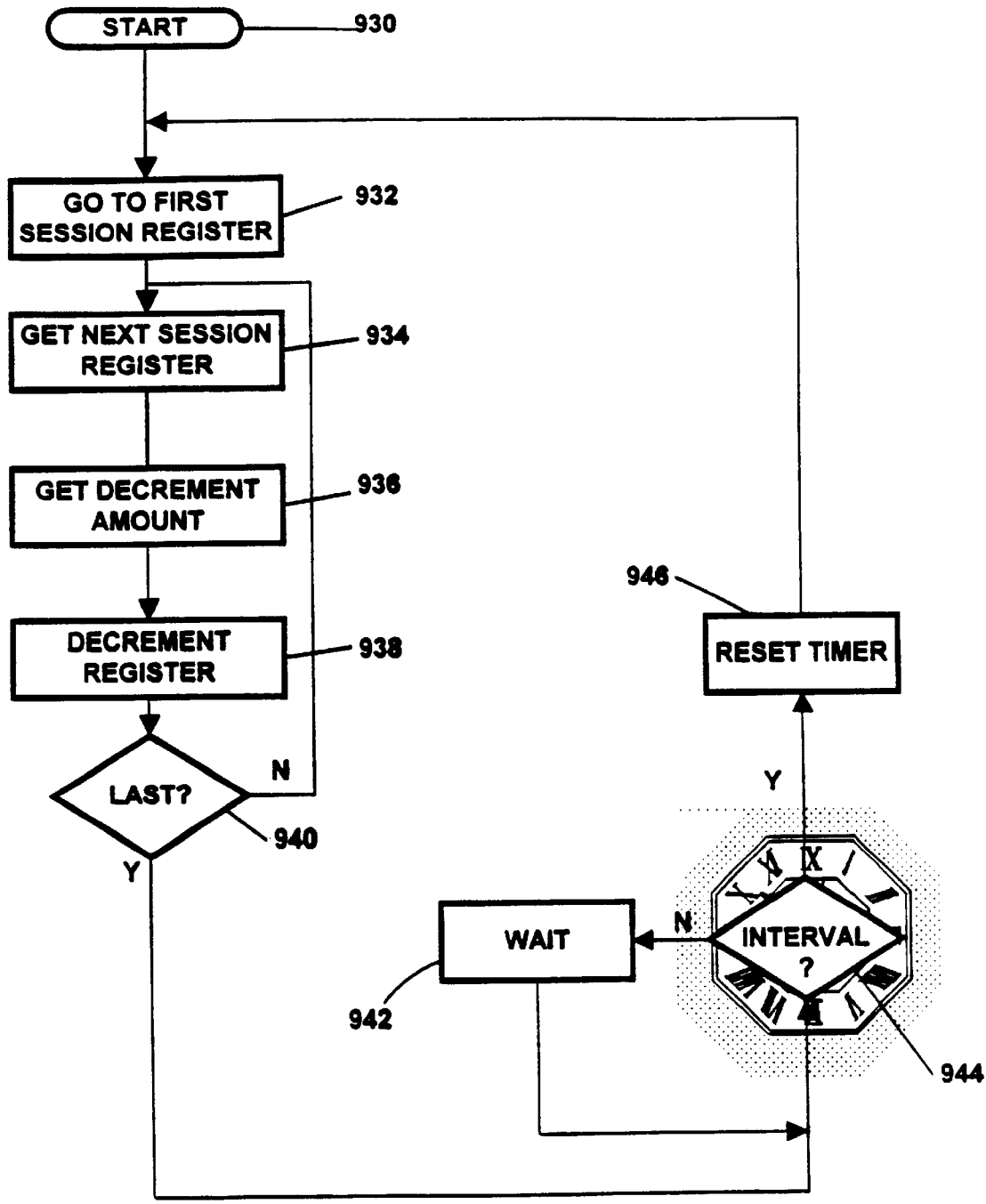
Figure 9C:
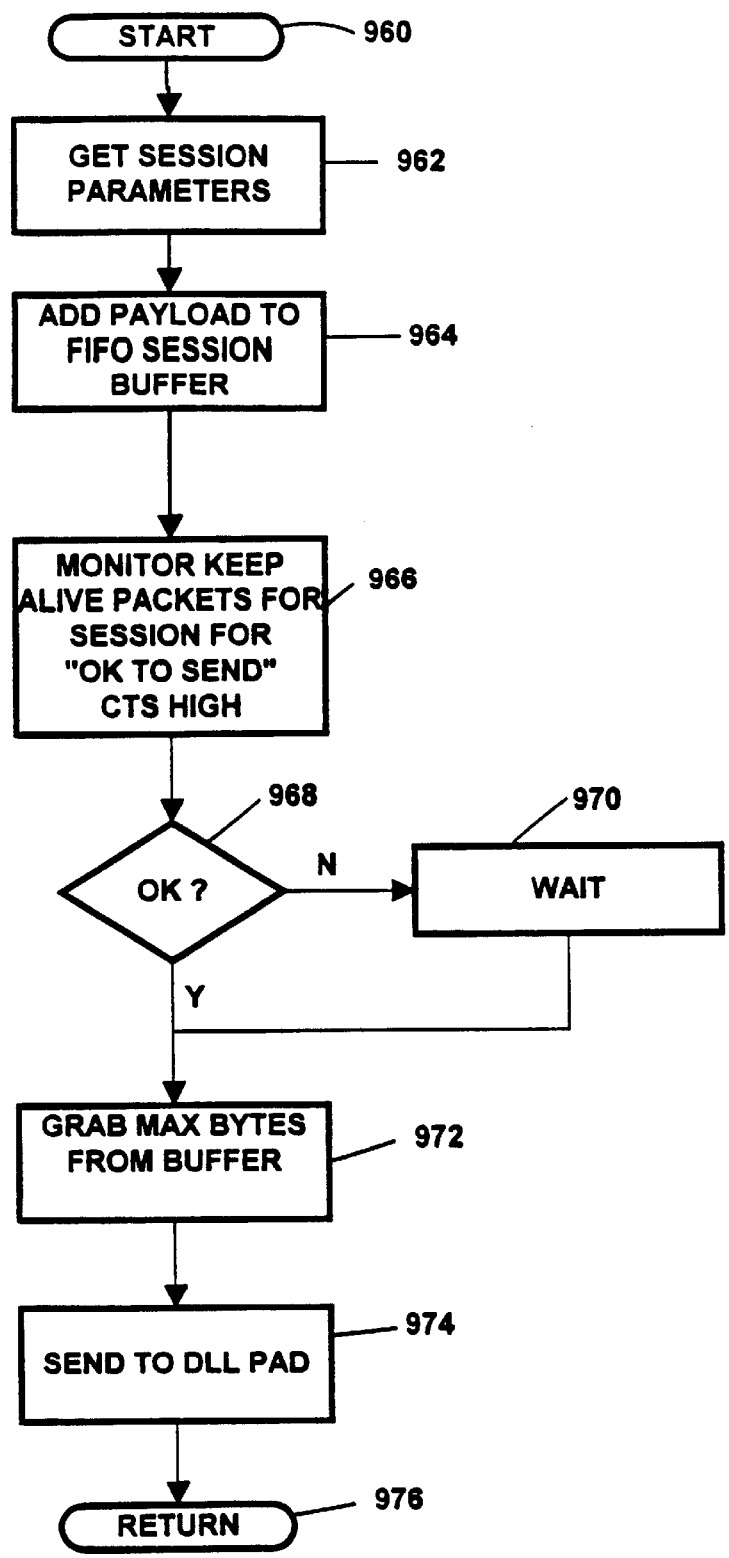

FIGS. 9A–B show detailed process flow diagrams of the outbound flow control processes invoked in FIG. 8A and specifically subroutines 814–816 thereof. In FIG. 9A, processing begins at entry block 900 from which control is passed to process 902. In process 902 the parameters for the session are retrieved by the DLL PAD 506 from the session table 534 (see FIG. 5). Control is then passed to process 910. In process 910 the register associated with this session is temporarily retrieved from the decrement subroutine 930. Control is then passed to process 912. In process 912 the size of the new payload is calculated and that amount is added to the value in the session register. Control is then passed to decision process 914. In decision process 914 a determination is made as to whether the value currently in the session register exceeds a maximum value. The maximum value is proportionate to the size of the buffer in the remote line server 112A (See FIGS. 1A–D). This information, as to line server buffer size, is stored in the line server table 530 and retrieved by the PPP PAD 518 in the course of this determination (see FIG. 5). In the event determination is affirmative, control is passed to process 916.

In process 916 the variable CTS which is present in keep alive packets sent between the packet processor and the local clients is lowered. This causes the local client to stop sending information to the packet processor. Alternately, if a determination in the negative is reached in decision process 914 then control is passed to process 918. In process 918 the CTS bit is raised in the keep alive packet sent to the local client for the session. This causes the local client to reenable communications with the packet processor. Control is then passed to process 920. Control is also passed to process 920 from process 916. In process 920 the session register is returned to the decrement subroutine 930, the processes for which will set forth in the following FIG. 9B. Control is then passed to return block 922 and specifically to decision process 818 (see FIG. 8A).

FIG. 9B shows the processes associated with the decrement subroutine referred to above in FIG. 9A. The decrement subroutine is part of outbound flow control subroutines 814–816 is discussed above in FIG. 8A. Processing begins at start block 930 from which control is passed to process 932. In process 932 a pointer is reset to the start of the first of the session registers. The session registers are all the registers associated with all the outgoing sessions being handled by the PPP PAD 518 (see FIG. 5). Control is passed to process 934 in which the the session register is obtained. Control is then passed to process 936. In process 936 the decrement amount calculated for the specific register for this session is retrieved by the PPP PAD 518 from the session table 534 (see FIGS. 5 and 9D). Control is then passed to process 938. In process 938 the current value of the session register being processed is decremented by an amount equal to the decrement amount for that register. Control is then passed to decision process 940. In decision process 940 a determination is made as to whether the last of the session registers has been decremented. In the event that determination is in negative control is returned to process 934 in which the next register is obtained. In the event an affirmative determination is reached in decision process 940, i.e. that last of the session registers on this pass has been decremented the control is passed to decision process 944. In decision process 944 the value of a resettable down timer is evaluated to see if it has reached zero. In the event that determination is negative, control is passed to process 942. In process 942 a wait state is introduced. Control then returns to decisoin process 944. When an affirmative determination is reached in decision process 944, i.e. that the down count timer interval has expired, then control is passed to process 946. In process 946 the value of the interval timer is reset to its upper limit. Control is then returned to process 932. The process of adding payload size to registers, and periodically decrementing registers by an amount proportionate to the baud rate established for the session assures that when actual baud rates exceed negotiated baud rates a CTS signal will be sent to the local client to cease transmission until such time as actual baud rates return to the negotiated level. In an alternate embodiment of invention outbound flow control may be disabled if the payload packet protocol itself provides suitable means for flow control, e.g. transport layer header control bits.

FIG. 9C shows the details of the processes associated with inbound flow control first set forth in FIG. 8B processes 858–860. Processing commences at start block 960 from which control is passed to process 962. In process 962 the session parameters are retrieved by the PPP PAD 518 from the session table 534 (see FIG. 5). Control is then passed to process 964. In process 964 the payload portion of the incoming WAN packet is added to the FIFO session buffer allocated for this session and recorded in session table. Control is then passed to decision process 966.

In decision process 966 the keep alive packets from the local client to which the inbound packets are being sent are monitored by the PPP PAD 518 (see FIG. 5) to determine if CTS has been raised indicating that it is okay to send more packets to the local client. In the event this determination is negative,, control is passed to process 970 in which a wait state is introduced. Subsequent to the wait state control is passed to process 972. Control is also passed to process 972 if an affirmative determination is reached in decision process 968, i.e. that CTS has been raised, and that it is OK to send the next packet to the local client. In process 972 the maximum number of payload bytes for the LAN traffic are retrieved from the FIFO session buffer and sent 974 by the PPP PAD 518 (see FIG. 5) to the DLL PAD 602 (see FIG. 5). Control is then returned through return block 976 to the calling routine. In an alternate embodiment of the invention inbound flow control may be disabled if the payload packet protocol itself provides suitable means for flow control.

Figure 9D:
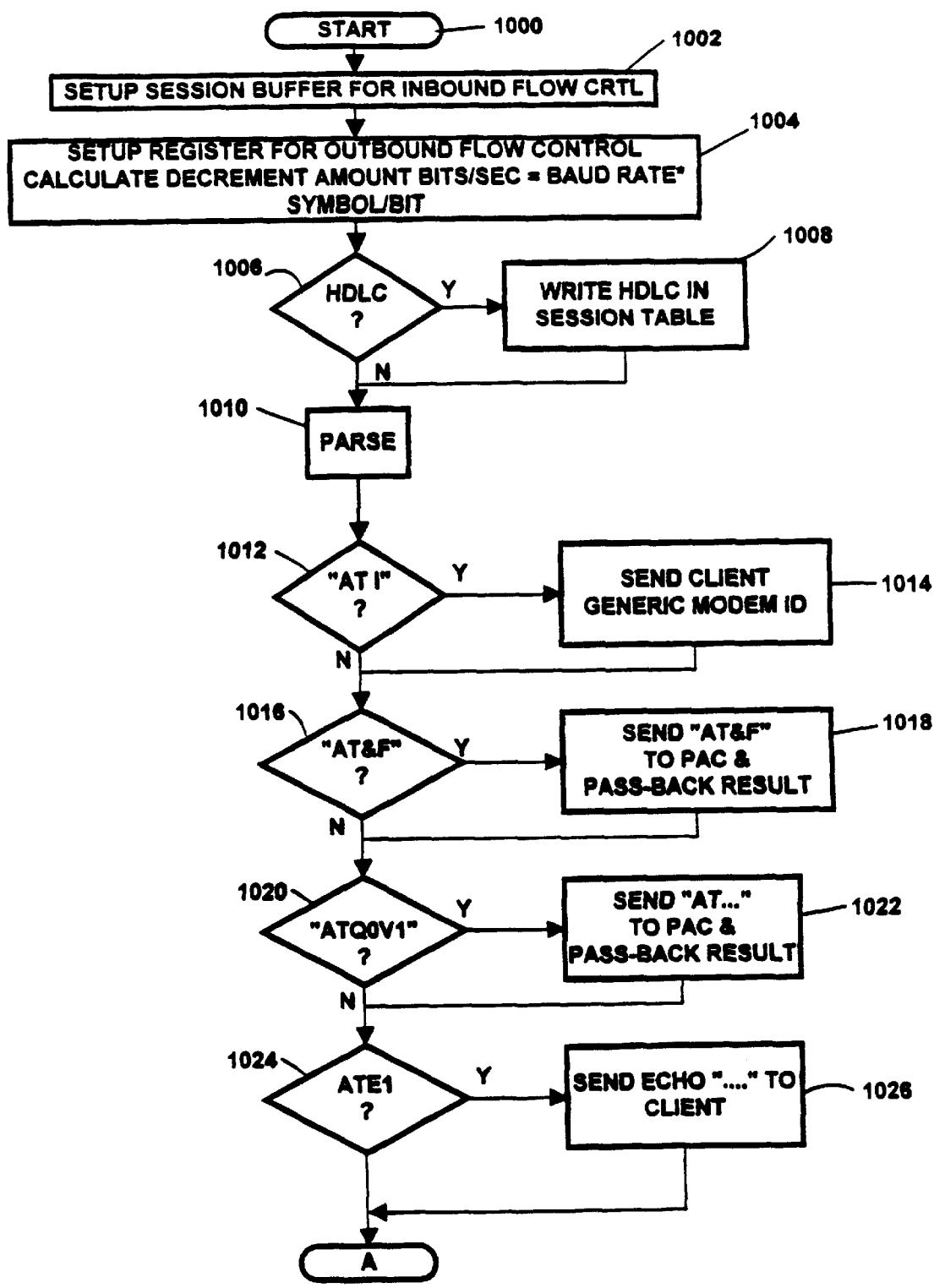

FIGS. 9D–E show the processes associated with session setup (see FIG. 8A subroutine 806). Processing begins at start block 1000 from which control is passed to process 1002. In process 1002 session buffer for inbound flow control is allocated and the location of the buffer recorded in session table 534 (See FIG. 5). Control is then passed to process 1004. In process 1004 a decrement register for outbound flow control is allocated and the location of the register recorded in session table 534. Also, in process 1004 an amount by which to decrement the register is calculated. The actual equation for register decrement amount in bits per second is the baud rate times the number of symbols per bit. The baud rate and the number of symbols per bit information may be contained in the session table 534 (See FIG. 5). In an embodiment of the current invention the symbols per bit may be a fixed value, e.g. 8 bits per symbol. Control is then passed to decision process 1006. In decision process 1006 the incoming packet is analyzed to determine if the payload portion contains an HDLC wrapper (See FIG. 2C). If the determination is affirmative, control is passed to process 1008. In process 1008 a notation is made in the session table 534 that the payload from the local client includes an HDLC wrapper. Control is then passed to process 1010. Alternately, if a negative determination is reached in decision process 1006, i.e. that the packet payload is not HDLC wrapped then control is also passed to process 1010.

In process 1010 the payload of the incoming packet is parsed for AT command strings. The AT command set was developed by Hayes and is the de facto standard language for controlling modems. It is recognized by virtually all PC modems. Control is then passed to decision process 1012. In decision process 1012 a determination is made as to whether the command string ATI, i.e. inquiry command string, is present in the payload of the incoming LAN packet. If this determination is affirmative control is passed to process 1014. In process 1014 the PPP PAD 518 (see FIG. 5) issues a generic modem ID and parameters to the local client. The local client therefore assumes it is communicating with the generic modem. Control is then passed to decision process 1016. Control is also passed to decision process 1016 if alternately in decision process 1012 a negative determination is reached.

In decision process 1016 a determination is made as to whether the command string AT&F is present in the payload of the incoming LAN packet. The AT&F command string represents a request to return the modem to factory default settings. If this determination is affirmative control is passed to process 1018. In process 1018 the AT&F string is passed from to the packet processor 108 to the line server 112A. The response from the line server is sent back to the local client and the result stored in the session table 534 (See FIG. 5). In an alternate embodiment of the invention a response to the command is faked directly to the local client without transmission to the remote line server. Control is then passed to decision process 1020. Control is also passed to decision process 1020 if alternately in decision process 1016 a negative determination is reached.

In decision process 1020 a determination is made as to whether the AT command string ATQZ0V1 has been received in the payload of the incoming LAN packet. If this determination is affirmative, control is passed to process 1022. In process 1022 the command string ATQZ0V1 is sent to the line server. When a result is retrieved from the line server that is passed back to the local client and recorded in the session table 534. Control is then passed to decision process 1024. Control is also passed to decision process 1024 if in decision process 1020 a negative determination is reached.

In decision process 1024 a determination is made as to whether the AT command string ATE1 has been received. If this determination is affirmative, control is passed to process 1026. In process 1026 the command strings from the local client are echoed as received. Control is then passed to splice block A. Control is also passed to splice block A if a negative determination is reached in decision process 1024.

FIG. 9E shows remaining setup processes, From start block A control is passed to decision process 1032. In decision process 1032 a determination is made as to whether the command string AT#, e.g. phone number, has been received. If that determination is negative, then control returns to decision process 1032. If alternately a determination in the affirmative is reached then control is passed to process 1034. In process 1034 the number is parsed. Control is then passed to process 1036. In process 1036 the PPP PAD 518 using the line server table 530 (See FIG. 5) looks up the appropriate remote line server for the area code that is being dialed, and obtains its network address. The line server table contains for all area codes, a preferred access provider, e.g. remote line server and the network address of the remote line server. The line servers may be listed as preferred because of their location relative to the area code being dialed, i.e. the line server may be able to access the area code being dialed at local rather than long distance toll rates. Line servers may also be identified in the line server table as preferred based on their capacity or throughput, e.g. baud rate.

Control is then passed to process 1038. In process 1038 the phone number just received from the local client is sent to the remote line server identified as a preferred line server. Control is then passed to process 1040. In process 1040 a response is received from the remote line server in the form of busy, no carrier, call connect signal, etc. Control is then passed to process 1042 in which a translation of that reply is sent to the local client which initiated the session. Control is then passed to process 1044 in which a transition to the data mode is initiated. A transition to the data/tunneling mode means that subsequent transmissions to or from the local client will wrapped at a network layer in a GRE header. Control is then passed to process 1046 for return of the subroutine.

The foregoing description of embodiments of the present invention has been presented for purposes of illustration and description only. It is not intended to be exhaustive or to limit the invention to be forms disclosed. Obviously, many modifications and variations will be apparent to practitioners skilled in the art.

GLOSSARY

Dial User: An end-system or router attached to an on-demand PSTN or ISDN which is either the initiator or recipient of a call.

Network Access Server (NAS): A device providing temporary, on-demand network access to users. This access is point-to-point using PSTN or ISDN lines.

PPTP Access Concentrator (PAC): A device attached to one or more PSTN or ISDN lines capable of PPP operation and of handling the PPTP protocol. The PAC need only implement TCP/IP to pass traffic to one or more PNSs. It may also tunnel non-IP protocols.

PPTP Network Server (PNS): A PNS is envisioned to operate on general-purpose computing/server platforms. The PNS handles the server side of the PPTP protocol. Since PPTP relies completely on TCP/IP and is independent of the interface hardware, the PNS may use any combination of IP interface hardware including LAN and WAN devices.

Session: PPTP is connection-oriented. The PNS and PAC maintain state for each user that is attached to a PAC. A session is created when end-to-end PPP connection is attempted between a dial user and the PNS. The datagrams related to a session are sent over the tunnel between the PAC and PNS.

Tunnel: A tunnel is defined by a PNS-PAC pair. The tunnel protocol is defined by a modified version of GRE [1,2]. The tunnel carries PPP datagrams between the PAC and the PNS. Many sessions are multiplexed on a single tunnel. A control connection operating over TCP controls the establishment, release, and maintenance of sessions and of the tunnel itself.

Call: A connection or attempted connection between two terminal endpoints on a PSTN or ISDN—for example, a telephone call between two modems.

Control Connection: A control connection is created for each PAC, PNS pair and operates over TCP [4]. The control connection governs aspects of the tunnel and of sessions assigned to the tunnel.

Dial User: An end-system or router attached to an on-demand PSTN or ISDN which is either the initiator or recipient of a call.

Network Access Server (NAS): A device providing temporary, on-demand network access to users. This access is point-to-point using PSTN or ISDN lines.

PPTP Access Concentrator (PAC): A device attached to one or more PSTN or ISDN lines capable of PPP operation and of handling the PPTP protocol. The PAC need only implement TCP/IP to pass traffic to one or more PNSs. It may also tunnel non-IP protocols.

PPTP Network Server (PNS): A PNS is envisioned to operate on general-purpose computing/server platforms. The PNS handles the server side of the PPTP protocol. Since PPTP relies completely on TCP/IP and is independent of the interface hardware, the PNS may use any combination of IP interface hardware including LAN and WAN devices.

Session: PPTP is connection-oriented. The PNS and PAC maintain state for each user that is attached to a PAC. A session is created when end-to-end PPP connection is attempted between a dial user and the PNS. The datagrams related to a session are sent over the tunnel between the PAC and PNS.

Tunnel: A tunnel is defined by a PNS-PAC pair. The tunnel protocol is defined by a modified version of GRE [1,2]. The tunnel carries PPP datagrams between the PAC and the PNS. Many sessions are multiplexed on a single tunnel. A control connection operating over TCP controls the establishment, release, and maintenance of sessions and of the tunnel itself.

What is claimed is:

1. In a system including a plurality of local clients coupled to a remote client, the plurality of local clients being coupled to a packet processor, the packet processor further being coupled to a remote line server via a first network, the remote line server being further coupled to the remote client via a second point-to-point network, a call-setup method implemented on the packet processor for providing dial-out capability for each of the plurality of local clients to the remote client, the call-setup method comprising the steps of:

detecting data packets from one of the plurality of local clients, where the detected data packets include a dial-out phone number of the remote client;

opening a first point-to-point connection to the remote line server via the first network;

passing the dial-out phone number to the remote line server to cause the remote line server to establish a second point-to-point connection to the remote client via the second point-to-point network; and transferring data packets from the one of the plurality of local clients through the first point-to-point connection and the second point-to-point connection to the remote client.

2. The call-setup method of claim 1, wherein the detecting step further comprises the steps of:

detecting a modem identification request for a destination modem in the data packets from the one of the plurality of local clients; and sending to the one of the plurality of local clients a generic modem identification responsive to detecting the modem identification request.

3. The call-setup method of claim 2, wherein the modem identification request includes the string "ATI".

4. The call-setup method of claim 1, wherein the detecting step further comprises the steps of:

detecting a modem duplex request in the data packets from the one of the plurality of local clients;

sending the modem duplex request via the first point-to-point connection to the remote line server; and passing the response to the modem duplex request from the remote line server to the local client.

5. The call-setup method of claim 4, wherein the modem duplex request includes at least one of the group of "AT" strings consisting of: "&F", "Q0" and "V1".

6. The call-setup method of claim 1, wherein the detecting step further comprises the steps of:

detecting a modem echo request in the data packets from the one of the one of the plurality of local clients; and sending to the one of the plurality of local clients the modem echo request.

7. The call-setup method of claim 6, wherein the modem echo request includes the string "ATE1".

8. The call-setup method of claim 1, wherein the transferring step further comprises the step of:

receiving at a first port on the packet processor the data packets from the one of the plurality of local clients destined for the remote client.

9. The call-setup method of claim 1, wherein the opening step further comprises the step of:

sending a data packet with a transport header implementing the transport control protocol (TCP) to the remote line server.

10. The call-setup method of claim 9, wherein the data packet with a transport header further comprises a start control connection request.

11. The call-setup method of claim 1, wherein the transferring step further comprises the step of:

sending a data packet with a transport header implementing the generic routing encapsulation (GRE) protocol to the remote line server.

12. The call-setup method of claim 1, wherein the transferring step further comprises the steps of:

determining that the data packets from the one of the plurality of local clients to the remote client include an HDLC payload wrapper; and removing the HDLC payload wrapper.

13. The call-setup method of claim 12, further comprising the step of:

determining that the data packets to the one of the plurality of local clients from the remote client do not include an HDLC payload wrapper; and adding an HDLC payload wrapper to the data packets.

14. The call-setup method of claim 1, wherein the transferring step further comprises the steps of:

allocating a register;

increasing a value stored in the register in proportion to a size of the data packets;

decrementing at a predetermined interval the value stored in the register by an amount proportionate to a data transfer rate; and sending a not-clear to send command to the one of the plurality of local clients when the value in the register exceeds a the amount proportionate to the data transfer rate to control the flow of data packets.

15. The call-setup method of claim 1, wherein the transferring step further comprises the steps of:

allocating a buffer;

receiving data packets from the remote client to the one of the plurality of local clients;

placing the data packets in the buffer;

detecting a clear to send command from the one of the plurality of local clients; and sending data from the data packet to the one of the plurality of local clients.

16. The call-setup method of claim 1, wherein the detecting step further comprises the step of:

correlating the dial-out phone number to the remote line server on the basis of a table indicating that the remote line server interfaces with the remote client.

17. In a system including a plurality of local clients coupled to a remote client through respectively, the local client being coupled to a packet processor, the packet processor further being coupled to remote line server via a first network, the remote line server being further coupled to the remote client via a second point-to-point network, a call-setup method for providing dial-out capability for each of the plurality of local clients to the remote client, the call-setup method comprising the steps of:

redirecting modem communications including a dial-out phone number from an application on one of the plurality of the local clients to the packet processor across a packet switched network;

detecting at the packet processor data packets from one of the plurality of local clients, where the detected data packets include a dial-out phone number of the remote client;

opening a first point-to-point connection from the packet processor to the remote line server;

passing the dial-out phone number from the packet processor to the remote line server to cause the remote line server to establish a second point-to-point a connection to the remote client via the second point-to-point network; and transferring through the packet processor data packets from the one of the plurality of local clients through the first point-to-point connection and the second point-to-point connection to the remote client.

18. The call-setup method of claim 1, wherein the detecting step further comprises the steps of:

detecting a modem identification request in the data packets from the one of the plurality of local clients; and sending to the one of the plurality of local clients a generic modem identification responsive to detecting the modem identification request.

19. The call-setup method of claim 18, wherein the modem identification request includes the string "ATI".

20. The call-setup method of claim 17, wherein the detecting step further comprises the steps of:

detecting a modem duplex request in the data packets from the one of plurality of local clients;

sending the modem duplex request via the first point-to-point connection to the remote line server; and passing the response to the modem duplex request from the remote line server to the local client.

21. The call-setup method of claim 20, wherein the modem duplex request includes at least one of the group of "AT" strings consisting of "&F", "Q0" and "V1".

22. The call-setup method of claim 17, wherein the detecting act further comprises the acts of:

detecting a modem echo request in the data packets from the one of the plurality of local clients; and sending to the one of the plurality of local clients the modem echo request.

23. The call-setup method of claim 22, wherein the modem echo request includes the string "ATE1".

24. The call-setup method of claim 17, wherein the transferring step further comprises the step of:

receiving at a first port on the packet processor the data packets from the one of the plurality of local clients destined for the remote client.

25. The call-setup method of claim 17, wherein the opening step further comprises the step of:

sending a data packet with a transport header implementing the transport control protocol (TCP) to the remote line server.

26. The call-setup method of claim 25, wherein the data packet with a transport header further comprises a start control connection request.

27. The call-setup method of claim 17, wherein the transferring step further comprises the step of:

sending a data packet with a transport header implementing the generic routing encapsulation (GRE) protocol to the remote line server.

28. The call-setup method of claim 17, wherein the transferring step further comprises the steps of:

determining that the data packets from the one of the plurality of local clients to the remote client include an HDLC payload wrapper; and removing the HDLC payload wrapper.

29. The call-setup method of claim 28, further comprising the steps of:

determining that the data packets to the one of the plurality of local clients from the remote client do not include an HDLC payload wrapper; and adding an HDLC payload wrapper to the data packets.

30. The call-setup method of claim 29, wherein the transferring step further comprises the steps of:

allocating a register;

increasing a value stored in the register in proportion to a size of the data packets;

decrementing at a predetermined interval the value stored in the register by an amount proportionate to a data transfer rate; and sending a not-clear to send command to the one of the plurality of local clients when the value in the register exceeds a the amount proportionate to the data transfer rate to control the flow of data packets.

31. The call-setup method of claim 17, wherein the transferring step further comprises the steps of:

allocating a buffer;

receiving data packets from the remote client to the one of the plurality of local clients;

placing the data packets in the buffer;

detecting a clear to send command from the one of the plurality of local clients; and sending data from the data packets to the one of the plurality of local clients.

32. The client-setup method of claim 17, wherein the detecting step further comprises the step of:

correlating the dial-out phone number to the remote line server on the basis of a table indicating that the remote line server interfaces with the remote client.

33. A packet processor for providing each of a plurality of local clients, dial-out capability to a remote client, the packet processor coupled to the plurality of local clients, the packet processor being further coupled to a remote line server via a first network, the remote line server being further coupled to the remote client via a second point-to-point network, the packet processor comprising:

a first interface for coupling to each of the plurality of local clients and for detecting from one of the plurality of local clients, a data packet including a dial-out phone number of the remote client;

a second interface for coupling to the first network and for opening a first point-to-point connection to the remote line server, responsive to detecting the data packet; and a bridge/router for passing the dial-out phone number to the remote line server across the first point-to-point connection to cause the remote line server to establish a second point-to-point connection via the second point-to-point network to the remote client for the transfer of data packets from one of the plurality of local clients.

34. The packet processor of claim 33, wherein the bridge/router further comprises:

logic for detecting a modem identification request in the data packets from the one of the plurality of local clients and, responsively, sending to the one of the plurality of local clients a generic modem identification.

35. The packet processor of claim 34, wherein the modem identification request includes the string "ATI".

36. The packet processor of claim 33, wherein the bridge/router further comprises:

logic for detecting a modem duplex request in the data packets from the one of the plurality of local clients;

logic for sending the modem duplex request via the first point-to-point connection to the remote line server; and logic for passing the response to the modem duplex request from the remote line server to the one of the plurality of local clients.

37. The packet processor of claim 36, wherein the modem duplex request includes at least one of the group of "AT" strings consisting of "&F", "Q0" and "V1".

38. The packet processor of claim 33, wherein the bridge/router further comprises:

logic for detecting a modem echo request in the data packets from the one of the plurality of local clients; and logic for sending to the one of the plurality of local clients the modem echo request.

39. The packet processor of claim 38, wherein the modem echo request includes the string "ATE1".

40. The packet processor of claim 33, wherein the bridge/router further comprises:

logic for receiving at a first port on the packet processor the data packets from the one of the plurality of local clients destined for the remote client.

41. The packet processor of claim 33, wherein the second interface further comprises:

logic for sending the data packet with a transport header implementing the transport control protocol (TCP) to the remote line server.

42. The packet processor of claim 41, wherein the data packet with a transport header further comprises a start control connection request.

43. The packet processor of claim 33, wherein the bridge/router further comprises:

logic for sending a data packet with a transport header implementing the generic routing encapsulation (GRE) protocol to the remote line server.

44. The packet processor of claim 33, wherein the bridge/router further comprises:

logic for determining that the data packets from the one of the plurality of local clients to the remote client include an HDLC payload wrapper; and logic for removing the HDLC payload wrapper.

45. The packet processor of claim 44, further comprising:

logic for determining that the data packets to the one of the plurality of local clients from the remote client do not include an HDLC payload wrapper; and logic for adding an HDLC payload wrapper to the data packets.

46. The packet processor of claim 33, wherein the bridge/router further comprises:

logic for allocating a register;

logic for increasing a value stored in the register in proportion to a size of the data packets;

logic for decrementing at a predetermined interval the value stored in the register by an amount proportionate to a data transfer rate; and logic for sending a not-clear to send command to the one of the plurality of local clients when the value in the register exceeds a the amount proportionate to the data transfer rate to control the flow or data packets.

47. The packet processor of claim 33, wherein the bridge/router further comprises:

logic for allocating a buffer;

logic for receiving data packets from the remote client to the one of the plurality of local clients;

logic for placing the data packets in the buffer;

logic for detecting a clear to send command from the one of the plurality of local clients; and logic for sending data from the data packets to the one of the plurality of local clients.

48. The packet processor of claim 33, wherein the first interface further comprises:

logic for correlating the dial-out phone number to the remote line server on the basis of a table indicating that the remote line server interfaces with the remote client.

49. A system for providing dial-out capability for each of a plurality of local clients to a remote client, the plurality of local clients coupled to a packet processor, the packet processor being further coupled to a remote line server via a first network, the remote line server being further coupled to the remote client via a second point-to-point network:

the packet processor comprising:

a first interface for coupling to each of the plurality of local clients and for detecting from one of the plurality of local clients data packets, where the detected data packets contain a dial-out phone number of the remote client;

a second interface for coupling to the first network and for opening a first point-to-point connection to the remote line server, responsive to detecting the data packets; and a bridge/router for passing the dial-out phone number to the remote line server across the first point-to-point connection to cause the remote line server to establish a second point-to-point a connection via the second point-to-point network to the remote client for the transfer of data packets from one of the plurality of local clients; and the one of the plurality of local clients comprising:

a modem shell for redirecting modem communications including a dial-out phone number from an application on the local client to the packet processor across a packet switched network.

50. The packet processor of claim 49, wherein the bridge/router further comprises:

logic for detecting a modem identification request in the data packets from the one of the plurality of local clients and, responsively, sending to the one of the plurality of local clients a generic modem identification.

51. The packet processor of claim 50, wherein the modem identification request includes the string "ATI".

52. The packet processor of claim 49, wherein the bridge/router further comprises:

logic for detecting a modem duplex request in the data packets from the one of the plurality of local clients;

logic for sending the modem duplex request via the first point-to-point connection to the remote line server; and logic for passing the response to the modem duplex request from the remote line server to the one of the plurality of local clients.

53. The packet processor of claim 52, wherein the modem duplex request includes at least one of the group of "AT" strings consisting of: "&F", "Q0" and "V1".

54. The packet processor of claim 49, wherein the bridge/router further comprises:

logic for detecting a modem echo request in the data packets from the one of the plurality of local clients; and logic for sending to the one of the plurality of local clients the modem echo request.

55. The packet processor of claim 54, wherein the modem echo request includes the string "ATE1".

56. The packet processor of claim 49, wherein the bridge/router further comprises:

logic for receiving at a first port on the packet processor the data packets from the one of the plurality of local clients destined for the remote client.

57. The packet processor of claim 49, wherein the second interface further comprises:

logic for sending the data packet with a transport header implementing the transport control protocol (TCP) to the remote line server.

58. The packet processor of claim 57, wherein the data packet with a transport header further comprises a start control connection request.

59. The packet processor of claim 49, wherein the bridge/router further comprises:

logic for sending a data packet with a transport header implementing the generic routing encapsulation (GRE) protocol to the remote line server.

60. The packet processor of claim 49, wherein the bridge/router further comprises:

logic for determining that the data packets from the one of the plurality of local clients to the remote client include an HDLC payload wrapper; and logic for removing the HDLC payload wrapper.

61. The packet processor of claim 60, further comprising:

logic for determining that the data packets to the local client from the remote client do not include an HDLC payload wrapper; and logic for adding an HDLC payload wrapper to the data packets.

62. The packet processor of claim 49, wherein the bridge/router further comprises:

logic for allocating a register;

logic for increasing a value stored in the register in proportion to a size of the data packets;

logic for decrementing at a predetermined interval the value stored in the register by an amount proportionate to a data transfer rate; and logic for sending a not-clear to send command to the one of the plurality of local clients when the value in the register exceeds a the amount proportionate to the data transfer rate to control the flow of data packets.

63. The packet processor of claim 49, wherein the bridge/router further comprises:

logic for allocating a buffer;

logic for receiving data packets from the remote client to the one of the plurality of local clients;

logic for placing the data packets in the buffer;

logic for detecting a clear to send command from the one of the plurality of local clients; and logic for sending data from the data packets to the one of the plurality of local clients.

64. The packet processor of claim 49, wherein the first interface further comprises:

logic for correlating the dial-out phone number to the remote line server on the basis of a table indicating that the remote line server interfaces with the remote client.

* * * * *